United States Patent [19]

Rubinfeld et al.

[11] Patent Number: 4,831,520
[45] Date of Patent: May 16, 1989

[54] BUS INTERFACE CIRCUIT FOR DIGITAL DATA PROCESSOR

[75] Inventors: Paul I. Rubinfeld, Wayland; Anil K. Jain, Stow, both of Mass.

[73] Assignee: Digital Equipment Corporation, Maynard, Mass.

[21] Appl. No.: 17,647

[22] Filed: Feb. 24, 1987

[51] Int. Cl.⁴ .............................................. G06F 3/00
[52] U.S. Cl. ................................................. 364/200
[58] Field of Search ............................. 364/200, 900

[56] References Cited

U.S. PATENT DOCUMENTS 4,503,535  3/1985  Budde et al. .................... 364/200 X Primary Examiner—Raulfe B. Zache
Attorney, Agent, or Firm—Fish & Richardson

[57] ABSTRACT

A processor for use in a digital data processing system includes a bus interface circuit for transferring data to and from other units in the system and for controlling the transfer of information within the processor over an internal bus. The bus interface circuit includes two state machines, one for controlling the internal transfers of information, and the other for controlling the external transfers of information. The state machines communicate through flags which indicate when external operations are pending. A plurality of latches are provided to receive write data, a write address and a read address from other portions of the processor, and an input latch receives signals from other units in the system, thereby allowing both a wire operation and a read operation to be initiated at the same time. The processor continues operating unless another operation is required.

20 Claims, 11 Drawing Sheets

PROCESSOR 30

FPP OP CODE TRANSFER

FPP OPERAND TRANSFER (ONE WORD)
(FROM MEMORY)

FPP OPERAND TRANSFER (ONE WORD)
(FROM CACHE OR PROCESSOR REGISTER)

FPP RESULTS TO PROCESSOR

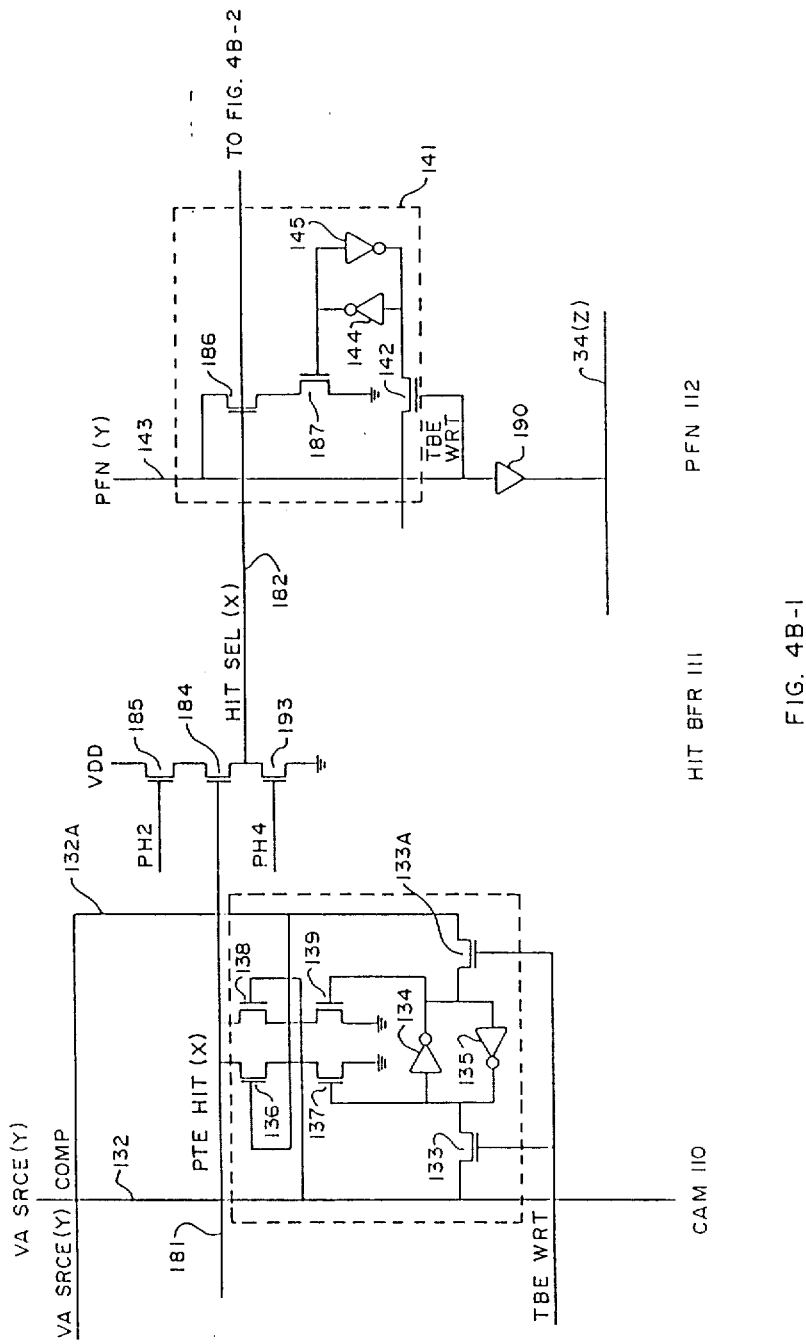

BUS INTERFACE CIRCUIT FOR DIGITAL DATA PROCESSOR

BACKGROUND OF THE INVENTION

1. Field of the Invention

The invention relates generally to the field of digital data processing systems.

2. Description of the Prior Art

A typical digital data processing system includes three basic elements, namely a processor element, a memory element, and an input/output element. The memory element stores information in addressable storage locations. This information includes both data and instructions for processing the data. The processor element includes one or more digital data processing units, or "processors", each of which causes information to be transferred, or fetched, to it from the memory element, interprets the incoming information as either instructions or data, and processes the data in accordance with the instructions. The results are then stored in addressed locations in the memory element.

The input/output element also communicates with the memory element in order to transfer information into the system and to obtain the processed data from it. Units comprising the input/output element normally operate in accordance with control information supplied to it by the processor element. The control information defines the operation to be performed by the input/output unit. At least one class of operations performed by an input/output unit is the transfer of user information, that is, information used by a user program, between the input/output unit and the memory element. Typical units comprising the input/output element include, for example, printers, teletypewriters, and video display terminals, and may also include secondary information storage devices such as disk or tape storage units.

In addition to functioning as input/output devices, disk storage units and, sometimes, tape storage units may also function as part of the memory element. In particular, a memory element typically includes a main memory, whose contents are accessible to the processor relatively quickly but which is generally relatively high-cost storage. Modern main memories are typically implemented using MOS or bipolar semiconductor technology and may provide on the order of a fraction of a megabyte to several tens of megabytes of storage.

A major bottleneck in processing of data by a processor is in the transfer of the instructions and data to be processed to the processor and the transfer of the processed data to other portions in the system. Transfers between the processor and the memory element are typically of data and instructions, and transfers between the processor and input/output element are typically of control information for controlling the operation of the input/output element, although the processor may also transfer data with some types of input/output units. A processor in a digital data processing system includes an interface circuit for transferring information with these units.

A processor also typically comprises several functional portions, including a cache memory for storing immediately used data and/or instructions, data path circuits for performing primitive arithmetic and logic operations to process the instructions, and control circuits for interpreting the instructions, enabling the operands, or data to be processed, to be obtained, enabling the data path to perform a series of operations to enable the operation identified by an instruction to be performed, and enabling the processed data to be stored. The transfer of information among the various internal functional portions of the processor is quite complicated, particularly when the processor includes a cache memory and supports virtual processing, and thus must provide virtual to physical address translation.

SUMMARY OF THE INVENTION

The invention provides a new processor for use in a digital data processing system.

In brief summary, a processor for use in a digital data processing system includes a bus interface circuit for transferring data to and from other units in the system and for controlling the transfer of information within the processor over an internal bus. The bus interface circuit includes two state machines, one for controlling the internal transfers of information, and the other for controlling the external transfers of information. The state machines communicate through flags which indicate when external operations are pending. A plurality of latches are provided to receive write data, a write address and a read address from other portions of the processor, and an input latch receives signals from other units in the system, thereby allowing both a write operation and a read operation to be initiated at the same time. The processor continues operating unless another operation is required.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 4B-1 and 4B-2, are more detailed circuit diagrams, of a portion of the processor depicted in FIG. 1 particularly relating to the translation of virtual addresses into physical addresses;

DETAILED DESCRIPTION OF AN ILLUSTRATIVE EMBODIMENT

General Description

Figure 1A:
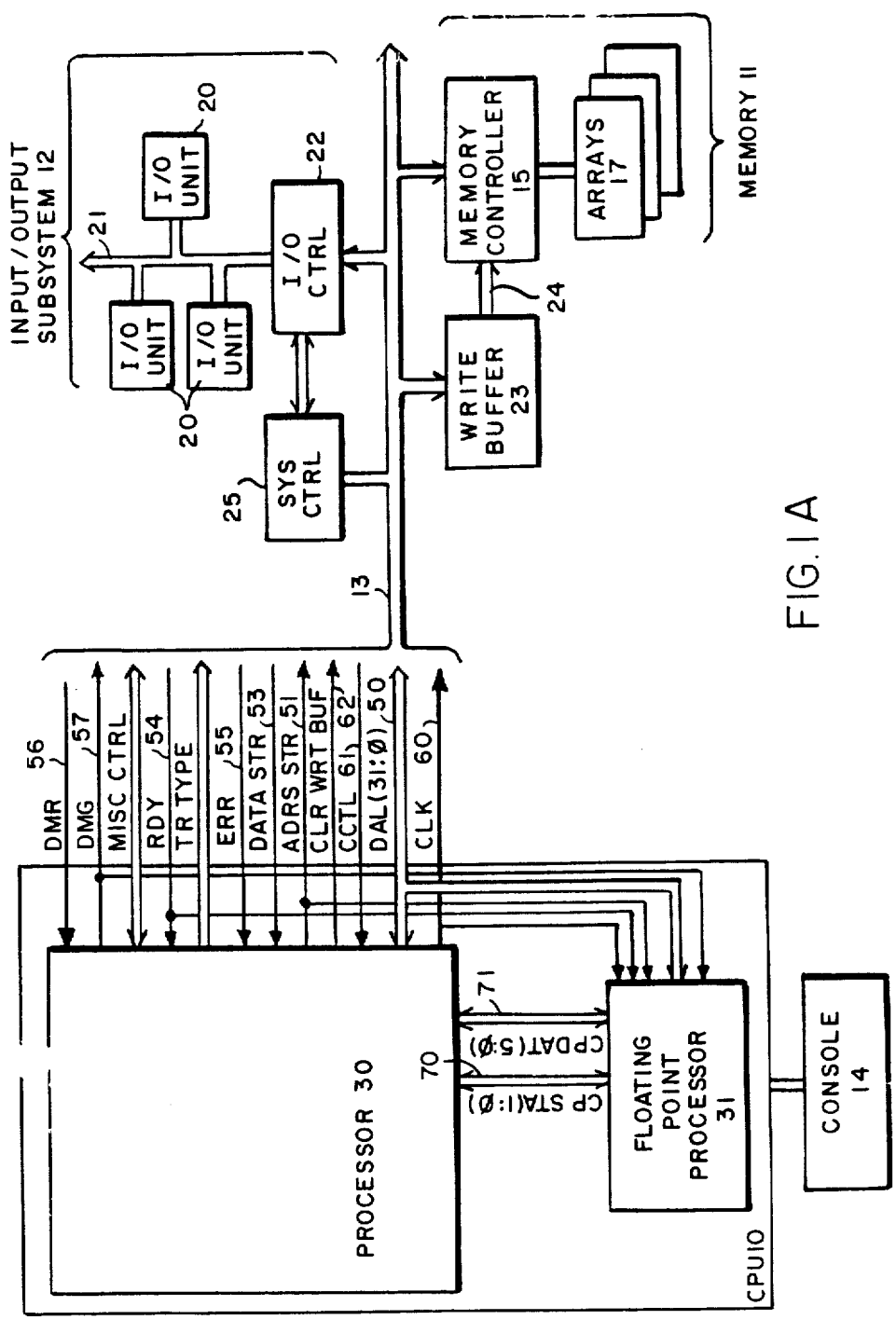
FIG. 1A is a general block diagram of a digital data processing system which incorporates the invention.

Referring to FIG. 1, a data processing system including the invention includes, as basic elements, a central processor unit (CPU) 10, a memory 11 and one or more input/output subsystems 12 (on input/output subsystem is shown in FIG. 1). A bus 13 interconnects the CPU 10, memory 11 and input/output subsystems 12 in parallel. The CPU 10 executes instructions that are stored in addressable storage locations in the memory 11. The instructions identify operations that are to be performed on operands, which are also stored in addressable locations in the memory unit. The instructions and operands are fetched by the CPU 10 as they are needed, and processed data are returned for storage in the memory 11. The CPU 10 also transmits control information to the input/output subsystems 12, enabling them to perform selected operations, such as transmitting data to or retrieving data from the memory 11. Such data may include instructions or operands which may be transmitted to the memory 11 or processed data which is retrieved from the memory 11 for storage or display.

An operators console 14 serves as the operator's interface. It allows the operator to examine and deposit data, halt the operation of the CPU 10 or step the CPU 10 through a sequence of instructions and determine the responses of the CPU 10 in response thereto. It also enables an operator to initialize the system through a boot strap procedure, and perform various diagnostic tests on the entire data processing system.

The data processing system may include several types of input/output input/output units 20, including disk and tape secondary storage units, teletypewriters, video display terminals, line printers, telephone and computer network units, and the like. All of these units communicate with the bus 13 over a device bus 21 through one or more controllers 22. A controller 22, the device bus 21 to which it is connected, and the input/output units 22 which communicate with the controller defines one input/output subsystem 12.

The memory 11 includes a memory controller 15, which is connected directly to the bus 13 and to a plurality of arrays 17. The arrays 17 contain a plurality of addressable storage location in which information is stored. The memory controller 15 receives transfer requests from the CPU 10 or from an input/output subsystem 12 over the bus 13. Several types of transfer requests may be transmitted over bus 13, which fall into two general categories. In one category, information is written into, or stored in, a storage location, and in the other category, information is retrieved, or read, from a storage location.

The system depicted in FIG. 1 also includes a write buffer 23 which connects to bus 13 and memory controller 15 and intercepts write transfer requests which are directed to by CPU 10 to memory 11. In that system, memory controller 15 does not respond to write requests which are transmitted over the bus 13 by either the CPU 10 or the input/output controller 22. In particular, the write buffer 11 buffers the write information, including both the data to be written and the associated addresses identifying the locations in arrays 17 into which the data is to be stored. When the memory controller can accept a write operation, the write buffer transmits the address and associated data over a private bus 24 to the memory controller 15, which proceeds to enable the arrays 17 to store the data in the location identified by the address. Thus, if the rate of transmission of write data by the CPU 10 over bus 13 becomes too great for the memory 11 to accept, the write buffer 23 can buffer the requests until the memory 11 can accept them. The memory controller 15 is also connected directly to bus 13 to respond to read requests from the CPU 10 or input/output controller 22 and return read data thereto.

It will be appreciated by those skilled in the art that a write buffer 23 can be advantageously used in a uniprocessor system as depicted in FIG. 1, but it will be most advantageously used in a multiprocessor system (not shown). In a multiprocessor system, the memory 11 will receive read and write requests from a number of CPUs and associated input/output subsystems 12. To avoid delaying processing by a CPU 10 waiting to perform a write operation, the write buffer 23 takes the write address and data and the CPU 10 can resume processing.

The write buffer further includes circuits for monitoring read requests over the bus 13 from the CPU 10. If the write buffer 23 determines that a read request has been transmitted over the bus 13 which identifies data which it is buffering and which it has not yet transferred to the memory 11, it inhibits, over its private bus 24, the memory controller from responding to the request. Instead, the write buffer 23 transmits the requested data over the bus 13 to complete the read operation.

The system depicted in FIG. 1 also includes a system control circuit 25 that, under control of the CPU 10, performs arbitration operations thereby regulating access of the various input/output subsystems 12 to the bus 13 if more than one is present in the system.

The CPU 10 includes a processor 30 and an optional floating point processor 31. As is typical, the floating point processor is an option and need not be present in a digital data processing system or CPU 10 constructed in accordance with the invention. The floating point processor includes circuits which are optimized for processing instructions on selected types of data, namely data in floating point formats. Typically, the processor 30 can process the same data, but it requires more time to perform the processing.

Figure 1B:
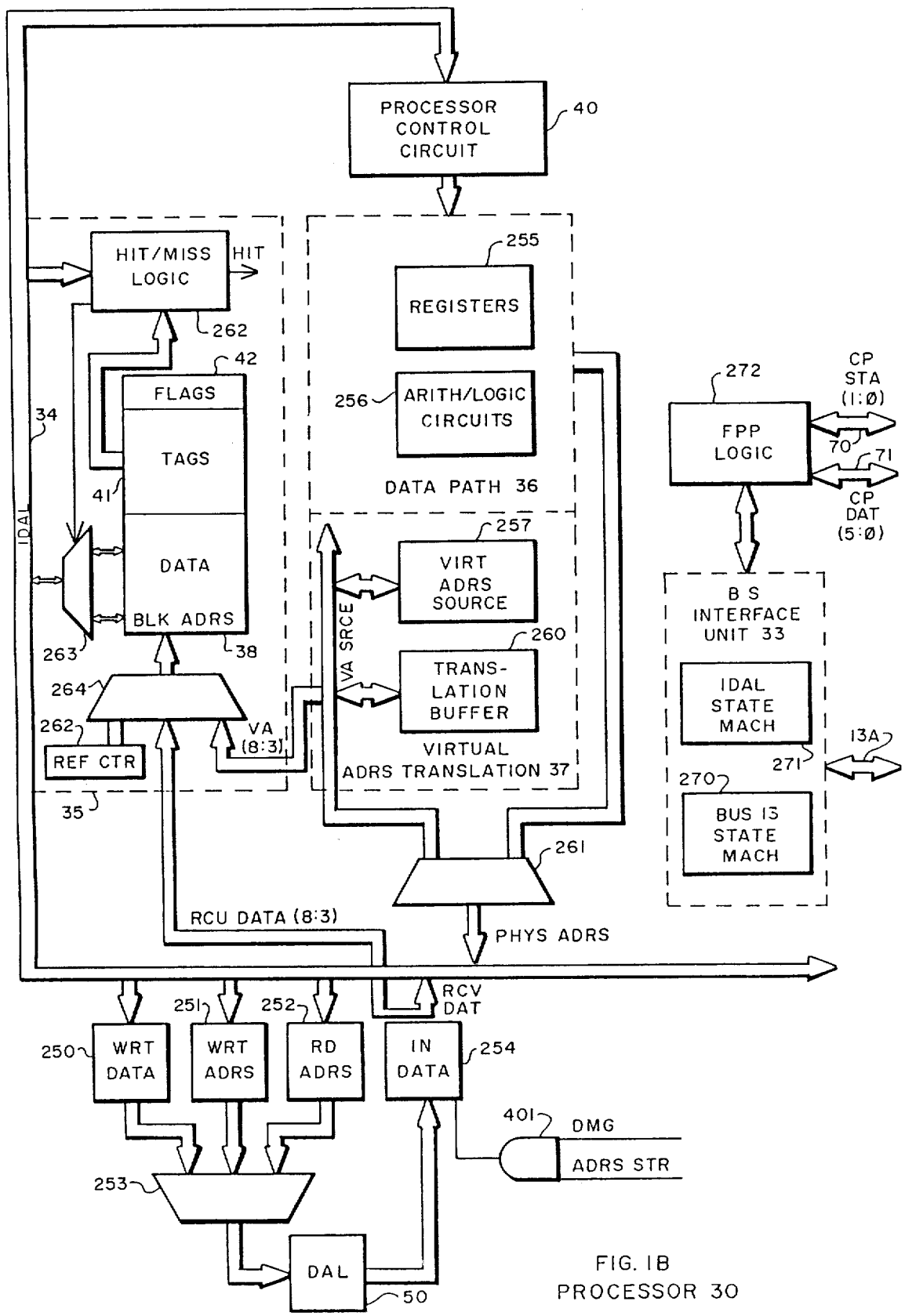
FIG. 1B is an organizational block diagram of a processor used in the system depicted in FIG. 1A.

A detailed functional block diagram of one processor 30 used in the system is depicted in FIG. 1B. With reference to FIG. 1B, processor 30 includes a bus interface circuit 33 which connects to various control lines of bus 13 (collectively indicated by reference numeral 13A) and transmits and receives signals over the various lines of the bus as described below. The bus interface circuit also connects to an internal IDAL bus 34 which transfers signals to and from a cache 35, a data path 36, a memory management unit 37, and a processor control circuit 40. A bus interface circuit 33 for one embodiment of processor 30 will be described below in connection with FIG. 6.

A number of registers also connect to the internal IDAL bus 34 and, under control of the bus interface circuit 33 transfers data between the internal IDAL bus 34 and DAL lines 50 of bus 13. Specifically, under control of the bus interface unit 33, a write data register 250 and a write address register 251 receive, respectively, write data and the address of the location in memory 11 or input/output units 12 in which the write data is to be stored. At appropriate times, as described below, the bus interface unit 33 enables the contents of these registers to be transmitted through a multiplexer 253 onto the DAL lines 50 to perform a write operation. Similarly, under control of the bus interface unit 33, a read address register 252 receives an address of a location containing data to be read. At an appropriate time, the bus interface unit 33 enables the contents of the read address register 252 to be coupled through multiplexer 253 onto the DAL lines 50 to perform a read operation.

The read data is latched in an input register 254, also under control of the bus interface unit 33. The bus interface unit 33 may enable the contents of the input register 254 to be coupled, as RCV DAT received data signals, onto the internal IDAL bus 34.

The processor control circuit 40 decodes program instructions which are retrieved from the memory 11 and in successive processing cycles enables the data path 36 to perform the arithmetic and logical operations which are required to execute the instruction. The data path 36 includes a set of registers 255 for storing data to be processed and arithmetic and logic circuits 256 for performing the processing. The data path 36 will be described in more detail below in connection with FIGS. 3A and 3B.

One embodiment of processor 30 uses virtual addresses and provides virtual address translation circuits 37 for translating the virtual addresses to physical addresses. The virtual address translation circuits include a set of source registers 257 which receive the virtual addresses from other circuits in processor 30, most notably the data path 36, and a translation buffer 260 which includes some translation information. Translations are performed as necessary under control of the processor control circuit 40. Physical addresses are coupled from the translation circuits 37 onto the internal IDAL bus 34 through a multiplexer 261. The data path 36 may also include physical addresses, and provides a second source input for multiplexer 261. The processor control circuit 40 controls multiplexer 261.

Cache memory 35 is a conventional information storage circuit in a CPU 10. Cache memories are described in K. Hwang and F. Briggs, Computer Architecture And Parallel Processing (McGraw-Hill, 1984), Section 2.4, pp. 98, et seq, and V. Hamacher, Computer Organization (McGraw-Hill, 1984), Section 8.6, pp. 306, et seq. Cache memory 35 includes a data storage area 38 comprising a plurality of storage locations. The data storage area 38 is organized into blocks, with each block containing two storage locations. Each storage location stores one word of information, that is, the amount of information which may be transferred over bus 13 at one time. In one specific embodiment, a word of information corresponds to four bytes, or thirty-two binary digits, of information. Thus, each block can store eight bytes of information.

As described below more fully in connection with FIG. 5, cache memory 35 includes hit/miss logic circuits 262 which determines when a physical address generated by the virtual address translation circuits corresponds to an address in the cache memory 35. The low order portion of the virtual address from the source registers 257, in one embodiment the VA SRCE (8:3) signals, is coupled through a multiplexer 264 to select one block in the data storage area, and the associated tags 41 entry. The hit/miss logic circuits 262 then determine whether the contents of the associated tags 41 entry corresponds to the translated physical address. If there is such a correspondence, the hit/miss logic generates an asserted HIT signal which is transmitted to the bus interface unit 33. If the bus interface unit 33 does not receive an asserted HIT signal, it enables, in a conventional manner, an operation over bus 13 to retrieve the contents of the addressed location. If the HIT signal is asserted, the bus interface unit 33 does not enable the operation over bus 13, but instead allows the data from the cache data storage area 38 to be transmitted through a multiplexer 263 over the internal IDAL bus 34. Generally, such data will be transmitted to the data path 36.

As will be appreciated by those skilled in the art, the information stored in a block in the cache memory 35, when it is received from the memory unit 11, is a copy of the information stored in the memory unit 11. Each block in the cache memory 35 has an associated tag 41 whose contents are established by the bus interface circuit 36 to identify the locations in the memory unit 11 from which the information was copied. In addition, each block includes a stale flag 42 which is reset, or cleared, by the bus interface circuit to indicate whether or not the contents of the block are in fact copies of the locations identified by the tag, that is, whether or not the contents of the block are stale.

In one embodiment of cache memory 35 the data storage area 38, tags 41 and flags 42 are dynamic memories. A refresh counter 262, under control of the bus interface unit 33 generates refresh addresses which are coupled through multiplexer 264 to refresh the dynamic memories.

An instruction may contain one or more operand specifiers which identify the location of the operand in the registers in the data path 36, or which identify an address which identifies the location of the operand in the virtual address space. See, for example, U.S. Pat. No. 4,236,206, for a Central Processor Unit For Executing Instructions Of Variable Length, issued to W. D. Strecker, et al., on Nov. 25, 1980. The processor control circuit 40, in conjunction with the data path, decodes each operand specifier to identify the locations of the operands, and then proceeds to obtain them from the identified locations. An operand specifier may itself contain the operand (that is, the operand specifier may be a "literal"), the operand specifier may identify one of the data path's registers (not shown) as containing the operand.

Alternatively, the operand may be in a location in the program's virtual memory space, and the operand specifier may indicate how to determine that location. If the operand is in the virtual memory space, the control circuit 40 enables the memory management circuit 37 to translate the virtual address to the physical address. After the physical address of the operand has been obtained, the bus interface 33 obtains the operand. It first determines whether the operand is in the cache memory 35. If the operand is in the cache memory, the bus interface transmits the operand to the data path 36. On the other hand, if the operand is not in the cache memory 35, the bus interface circuit 33 transmits a read request over the bus 13 to the memory 11 to retrieve the operand. After all of the operands have been obtained, the data path 36 may perform the operation required by the instruction.

The operand specifier may also identify the location into which processed data is to be stored. The control circuit 40 and memory management circuit 37 are used in the same way as described above to determine the physical address. If the processed data is to be stored in memory 11, the bus interface 33 performs the required write operation over bus 13. In addition, if the physical address corresponds to an appropriate tag in cache 35, the bus interface 33 enables the data to be stored in the cache 35.

The bus interface unit 33 includes a state machine 270, which controls the transfer of data over bus 13, and an IDAL state machine 271, which controls the transfer of data over internal IDAL bus 34. The bus interface unit also controls an FPP logic circuit 272 which, in turn, controls communications with the floating point processor 31. The bus interface unit 33 will be described in more detail below in connection with FIG. 6.

Operations Over Bus 13

The bus 13 includes a number of lines for transferring signals representing information among the various units connected to it. In particular, bus 13 includes DAL (31:0) data address lines 50, which carry DAT data and ADRS address signals. If the CPU 10, specifically the processor 30, is initiating a transfer, making it the bus master for the transfer, processor 30 first transmits the ADRS address signals over the DAL (31:0) data address lines 50 and contemporaneously transmits TR TYPE (2:0) transfer type command signals on lines 52, which indicate whether the transfer operation is a read or a write operation. A short time later, sufficient to allow the ADRS address signals and TR TYPE (2:0) transfer type command signals to settle, the processor 30 then asserts an ADRS STR address strobe signal on a line 51.

When the ADRS STR address strobe signal is asserted, all of the other units connected to bus 13 receive and decode the ADRS address and TR TYPE (2:0) transfer type command signals, with the unit containing the location identified by the ADRS address signals being the responding unit, or slave, for the transfer. If the transfer operation is a write operation and the ADRS address signals identify a location in the memory 11, the write buffer 23 is the slave unit). A selected time later after the processor 30 asserts the ADRS STR address strobe signal, it removes the ADRS address signals and TR TYPE (2:0) transfer type command signals from the respective lines.

If the transmitted TR TYPE (2:0) transfer type command signals define a write operation, the master unit then transmits data signals over the lines 50, and then asserts a DATA STR data strobe signal on a line 53. The slave unit then receives and stores the transmitted data. When the data has been stored, the addressed unit then asserts a RDY ready signal on a line 54 if the operation was completed without error, or an ERR error signal on a line 55 if an error occurred during the storage operation.

If, on the other hand, the transmitted TR TYPE (2:0) transfer type command signals define a read operation, the slave unit retrieves the data from the location identified by the address signals, transmits them over the DAL (31:0) data address lines 50, and transmits an asserted RDY ready signal over line 54. In response, the processor 30 receives the data and transmits an asserted DATA STR data strobe signal over line 53.

In either a read or a write operation, after the slave has asserted the RDY ready signal or the ERR error signal if an error occurred during the transfer, the processor 30 negates the DATA STR data strobe signal. The slave unit then negates the RDY ready or ERR error signal, and then the processor 30 negates the ADRS STR address strobe signal to complete the transfer.

Units connected to bus 13 other than processor 30 may constitute bus masters and initiate transfers with the memory 11 thereover. The input/output subsystem 12, and in particular, their input/output controller 22 may become bus master. To become bus master, input/output controller 22 asserts a DMR direct memory request signal over a line 56. The processor 30 then asserts a DMG direct memory grant signal on a line 57, which is received by the input/output controller 22. At that point the input/output controller initiates a transfer with the memory in the same way as described above in connection with the processor 30. The input/output controller maintains the DMR direct memory request signal asserted until it has completed the transfer. Thus, if the input/output controller requires multiple transfers, it may maintain the DMR direct memory request signal asserted until it has completed the transfers. While the DMR direct memory request signal is asserted, the processor 30 is in a stalled condition, that is, it monitors the signals on the various lines of bus 13, but otherwise it does not execute any instructions.

If the system includes multiple input/output subsystems 12, separate request signals by the input/output controllers 22 to become bus master are transmitted to the system controller, which asserts the DMR direct memory request signal and monitors the condition of the DMG direct memory grant signal. When the processor 30 asserts the DMG direct memory grant signal, the system controller enables one of the input/output controllers 22 to become bus master according to any priority arbitration scheme.

Bus 13 also has a number of other lines which carry status and control signals. A line 60 carries CLK clock signals which are used to synchronize operations in the system. The various signals on bus 13 are timed in response to the CLK clock signals.

A line 61 carries a CCTL cache control signal which has two functions. As described in copending U.S. patent application Ser. No. 908,825, filed Sept. 12, 1986, in the name of Paul Rubinfeld, for Cache Invalidate Protocol for Digital Data Processing System, the CCTL cache control signal is asserted by, for example, an input/output controller 22 when it is bus master and performing a write operation to memory 11. The input/output controller 22 asserts the CCTL signal while it is transmitting the ADRS address signals on the DAL data address lines 50, TR TYPE transfer type signals on lines 52 and asserting the ADRS STR address strobe signal on line 51. When the CCTL cache control signal is asserted and the TR TYPE transfer type signals indicate a write operation to memory 11, the bus interface 33 checks the contents of the tags 41 of all of the cache entries. If the ADRS signals on the DAL data address lines 50 of bus 13 correspond to the contents of a tag 41, the bus interface 33 resets the S stale flag 42 for that cache block.

The CCTL cache control signal is also asserted by memory 11 to prevent the processor 30 from storing data in the cache 35 that was requested during a read operation. This may be used, for example, where memory 13 is a multiport memory, that is, if it is being shared by several processors, with each processor accessing the memory 11 over a separate bus, and the data being retrieve is from a set of addressable storage locations that are available to all of the processors. It is undesirable to have such data stored in the cache 35 since another processor may update the contents of the shared locations and, since the updates are not over bus 13 they cannot be detected by the processor 30. If the processor 30 used such data from the cache, it may not correspond to the contents of the appropriate locations in memory. In connection with this use of the CCTL cache control signal, the memory 11 asserts the CCTL cache control signal contemporaneously with its transmission of the data over the DAL data address lines 50, and maintains the CCTL cache control signal asserted until it removes the data.

Bus 13 also includes a line 62 which carries a CLR WRT BUF clear write buffer signal. The CLR WRT BUF clear write buffer signal is asserted by the processor 30 in response to certain conditions internal to processor 30 which would not e otherwise detectable outside of processor 30. For example, the processor 30 asserts the CLR WRT BUF clear write buffer signal when it executes an instruction which causes it to switch process contexts or when it starts to execute an interrupt service routine or an exception routine. The CLR WRT BUF clear write buffer signal is controlled by a field in microinstructions that are generated by the processor control circuit 40 while executing those instructions.

When the CLR WRT BUF clear write buffer signal is asserted, the write buffer 23 determines whether it contains data to be stored in memory 11. If it does not, it does nothing. However, if the write buffer 23 does contain data to be stored in memory 11, it asserts the DMR direct memory request signal and continues to attempt to store its remaining data in the memory 11. In response to the asserted DMR direct memory request signal, the processor asserts the DMG direct memory grant signal, which is ignored by the write buffer 23, and it also stalls. The write buffer 23 maintains the DMR direct memory request signal in the asserted condition until all of the data which it contains has been properly stored in memory 11. If no error occurs in the storage, the write buffer 23 then negates the DMR direct memory request signal allowing the processor 30 to continue.

If an error does occur during a write to memory 11, the write buffer 23 signals an error to the processor, allowing the processor 30 to process routines to locate and correct the error within the current context. This greatly simplifies error recovery. If the processor is allowed to switch contexts before an error is detected, it would be difficult to determine the context which initially generated the data. Error recovery is simplified if the context can be identified, and so the write buffer 23 prevents the processor from switching contexts until all of the data from the current context has been properly stored in memory 11.

Transfers With Floating Point Processor 31

Figure 2A:
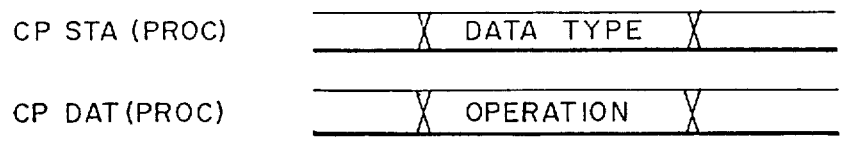
FIGS. 2A through 2D comprise timing diagrams useful in understanding the transfer of information in the system depicted in FIG. 1A.

Processor 30 also is connected to floating point processor 31 to (1) transfer the operation codes of floating point instructions to the floating point processor 31 to indicate the operation to be performed, as described below in connection with FIG. 2A, (2) enable operand data to be transferred to the floating point processor 31 for processing as described in connection with FIGS. 2B and 2C and (3) obtain processed data from the floating point processor 31 as described in connection with FIG. 2D. The processor 30 and floating point processor 31 are interconnected by two sets of lines 70 and 71, lines 70 carrying CP STA (1:0) floating point status signals and lines 71 carrying CP DAT (5:0) floating point data signals. The floating point processor 31 is also connected to several lines of bus 13, including DAL data address lines 50, line 60 for receiving the CLK signals, line 51 for receiving the ADRS STR address strobe signal, line 54 for receiving the RDY ready signal, line 55 for receiving the ERR error signal, and line 57 for receiving the DMG direct memory grant signal. The CP STA (1:0) floating point status signals and CP DAT (5:0) floating point data signals are transmitted synchronously with the CLK signals on line 60.

While it is idle, the floating point processor 31 repetitively samples, synchronously with the CLK signal on line 60, the conditions of the signals on the lines 70 and 71. When at least one of the lines 71 carries an asserted level signal, the floating point processor 31 latches the signals on those lines and the signals on lines 70. With reference to FIG. 2A, when the processor 30 transmits an instruction to the floating point processor 31, it transmits at least a portion of the instruction's operation code to the floating point processor 31 as CP DAT (5:0) floating point data signals over lines 71 during an interval defined by a selected number of ticks of the CLK clock signals. During the interval, in synchronism with one of the ticks of the CLK clock signals, the floating point processor 31 latches and stores the signals. At the end of the interval, the processor 30 removes the signals from the lines 70 and 71.

The CP DAT (5:0) floating point data signals transmitted over lines 71 are sufficient to identify a floating point arithmetic operation to be performed, and also identifies the number of operands to be used in the operation. Concurrently with the transmission of the operation information over lines 71, other information is transmitted as the CP STA (1:0) floating point status signals over lines 70 which provides further information relating to floating point processing. In particular, floating point operands may be encoded in a number of formats, termed data types, and information as to the format of the operands is transmitted as CP STA (1:0) floating point status signals over lines 70. In one embodiment, some of the information as to the format of the operands is also transmitted over the lines 71 along with the operation information.

Upon receiving the operation code, the floating point processor 31 decodes it to determine the operation to be performed and tee number of operands which are required. The processor 30 (in response to sending the operation code) and the floating point processor 31 (in response to receiving the operation code) then go into a condition in which the operands are transferred over DAL data address lines 50. The data type information is used to identify to the floating point processor 31 the format of each of the operands. In connection with some operand formats, more bits are required in some operand formats than can be accommodated by a single transfer over the DAL data address lines 50, and so multiple transfers are required to transfer a single operand. The data type information thus also indicates the number of transfers over DAL data address lines 50 that are required to transfer each operand.

An operand may be stored in one of three sources, namely, in the memory 11 (FIG. 1), in the cache 35, or in the processor's registers (shown in FIG. 3A) in the data path 36. The different operands required for a single operation may also be stored in any of the three sources. If multiple transfers over DAL data address lines 50 are required to transfer a single operand, however, all of the transfers are normally with respect to a single source. FIG. 2B depicts the conditions of the signals that are transmitted to retrieve an operand from memory and FIG. 2C depicts the signals transmitted to transfer an operand from the cache 35 or from registers in the data path 36. In particular, FIGS. 2B and 2C depict the conditions of the signals to effect a single transfer over DAL data address lines 50, and it should be recognized that multiple transfers may be required for a single operand.

Figure 2B:
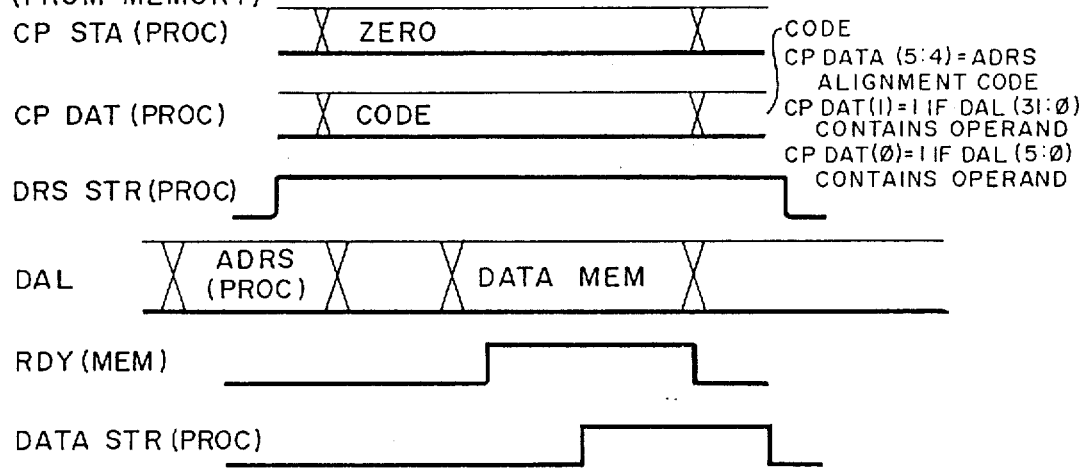

With reference to FIG. 2B, if an operand is in memory 11, the processor 30 initiates its retrieval from the memory 11. In particular, the processor 30 performs a read operation, as described above, placing the ADRS address signals on the DAL data address lines 50 and asserts the ADRS STR address strobe signal. Shortly thereafter, the processor 30 places CP STA (1:0) floating point status signals on lines 70 having the binary value zero, that is, it negates both of the CP STA (1:0) floating point status signals. In addition, the processor 30 transmits CP DAT (5:0) floating point data signals on lines 71 in which the CP DAT (5:4) floating point data signals contain an address alignment code, which indicates how much of the data transmitted over the DAL data address lines 50 is to be used in the operand. The CP DAT (0) floating point data signal is asserted if the operand is a short literal on the DAL (5:0) data address lines, and otherwise the CP DAT (1) floating point data signal is asserted.

Since the floating point processor 31 has already received the operation information in the procedure described above in connection with FIG. 2A, it is in condition to receive an operand. The asserted CP DAT (5:0) floating point data signal indicates to the floating point processor 31 that it is to sample the signals on selected lines of bus 13, in particular the line 51 which carries the ADRS STR address strobe signal. The floating point processor 31 uses the asserted condition of the ADRS STR address strobe signal to determine that the operand is being retrieved from the memory 11. If the ADRS STR address strobe signal is asserted when it receives the asserted CP DAT (5:0) floating point data signal, the floating point processor 31 latches the data signals on the DAL data address lines 50 in response to the assertion by the memory 11 of the RDY ready signal on line 54. The processor 30 responds with the DATA STR data strobe signal to complete the transfer.

It will be appreciated that, if the memory 11 responds to a retrieval request with an asserted ERR error signal instead of an asserted RDY ready signal, the floating point processor 31 will not latch the transmitted data signals on the DAL data address lines 50. The processor 30 performs any required error recovery operations, such as retries, which may be required and repeats the operation depicted in FIG. 2B.

Figure 2C:
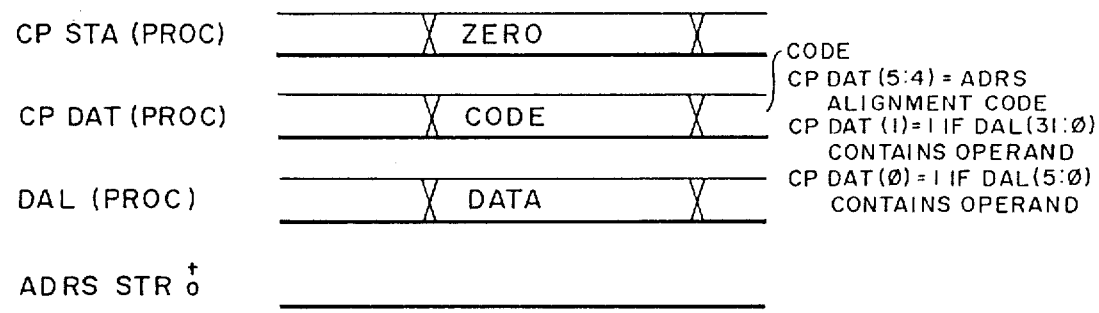

FIG. 2C depicts a timing diagram useful in understanding the transfer of an operand from the processor 30 to the floating point processor 31, whether the operand is in the cache 35 or in a register in data path 36 (described below in connection with FIG. 3A). In either case, the processor places data signals on the DAL data address lines 50 and CP DAT (5:0) floating point data signals having the same encoding as described above in connection with FIG. 2B, and negates both of the CP STA (1:0) floating point status signals. These signals are maintained by the processor 30 for a selected number of ticks of the CLK clock signals. During that interval, the floating point processor 31 latches the signals on the DAL data address lines 50. If multiple transfers are required over the DAL data address lines 50 to transfer an entire operand, the sequence depicted in FIG. 2C is repeated.

If an operand's data type is such that multiple transfers are required over DAL data address lines 50 to transfer an entire operand, the processor 30, memory 11 and floating point processor 31 repeat the operations depicted in FIGS. 2B and 2C until a complete operand is transferred.

It will be appreciated that the sequence of operations depicted in FIG. 2B is similar to the sequence of operations depicted in FIG. 2C, with the following difference. If the ADRS STR address strobe signal is asserted on line 51 when he CP DAT (5:0) floating point data signal is asserted, the floating point processor 31 uses the asserted RDY ready signal as an indication that the operand (or portion of the operand) is then on the DAL data address lines 50. However, if the ADRS STR address strobe signal is not asserted when the CP DAT (5:0) floating point data signal is asserted, the floating point processor 31 uses the assertion of the CP DAT (5:0) floating point data signal as an indication that the operand (or portion of the operand) is then on the DAL data address lines 50. In both cases, the floating point processor 31 latches the signals on the DAL data address lines 50 in synchronism with the CLK clock signals on line 60, in the first case after receiving the RDY ready signal and in the second case after receiving a CP DAT (5:0) floating point data signal which is asserted.

After the operands have been transferred, the processor 30 and floating point processor 31 go into a condition in which the processor 30 is prepared to receive the results when the floating point processor 31 is prepared to send them. FIG. 2D depicts a timing diagram which details the sequence of operations used by the processor 30 and floating point processor 31 to transfer the processed data to the processor 30. The processed data comprises both the condition codes, which indicates whether the result was a negative or a zero and selected other facts concerning the result, and data signals representing the value of the computation performed by the floating point processor 31.

Figure 2D:
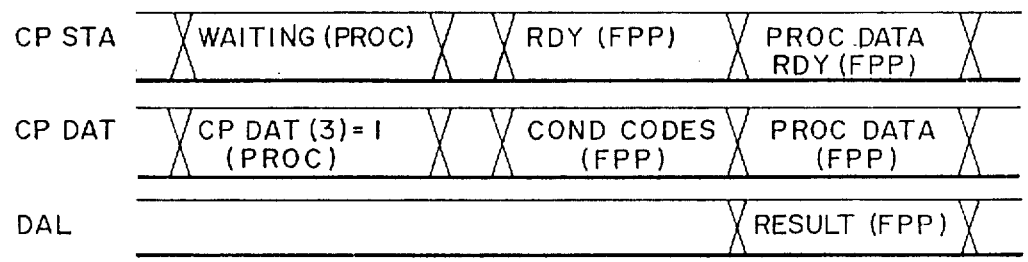

With reference to FIG. 2D, initially the processor 30 transmits a signal code over the lines 70 and 71 indicating that it is ready to receive the processed data. In one embodiment, the CP STA (1:0) floating point status signals are both negated, and the CP DAT (3) floating point data signal is asserted with the others negated. Thereafter, the floating point processor 31 may transmit over lines 70 and 71.

When the floating point processor 31 is ready to transfer the processed data, it transmits CP STA (1:0) floating point status signals representing a code to that effect, concurrently with CP DAT (5:0) floating point data signals representing the condition codes. The floating point processor 31 maintains these signals for a selected number of ticks of the CLK clock signals, and then places the data signals on the DAL data address lines 50, along with a code on lines 70 and 71 to that effect. If multiple transfers over DAL data address lines 50 to transfer the processed data signals, the floating point processor 31 transfers them synchronously with the CLK clock signals.

While the floating point processor 31 is processing operands and before it has transmitted the results to the processor 30, the processor 30 may assert the DMG direct memory grant signal to allow input/output subsystem 12 to engage in a transfer with memory 11. The floating point processor 31 monitors the condition of line 57 after the processor 30 has indicated that it is ready to receive the processed data. If the DMG direct memory grant signal is asserted on line 57 when the floating point processor 31 is ready to return the processed data, the floating point processor 31 delays returning the processed data until after the DMG signal has been negated.

In addition, if an error occurs in, for example, retrieving operands from memory 11, the processor 30 does not indicate that wishes to receive processed data from the floating point processor 31. The processor 30 does not abort the operation of the floating point processor 31; instead, when the processor 30 transmits a new operation code to the floating point processor 31, the floating point processor 31 operates on that operation code. It will be appreciated that the CP STA (1:0) floating point status signals and CP DAT (5:0) floating point data signals transmitted by the processor 30 over lines 70 and 71 to indicate that it is ready to receive the processed data should not correspond to any operation code, so as to allow the floating point processor 31 to distinguish between them.

Data Path 36

The data path 36 of processor 30 will be described in connection with FIGS. 3A and 3B. With reference to FIG. 3A, data path 36 includes a plurality of sets of registers, including a set of fifteen general purpose registers 80 identified as GPR 0 through GPR 14, a set of sixteen temporary registers 81 identified as TEMP 0 through TEMP 15, and a set of eight working registers 82 identified as W0 through W7. In addition, the data path 36 includes an arithmetic and logic unit 83 which, under control of ALU CTRL control signals from an ALU control circuit 84, performs arithmetic and logic operations on data from a number of sources. The ALU control circuit 84, in turn, is controlled by ALU OP SEL operation select signals provided by the control circuits 40 (FIG. 2) as described below (FIG. 3C). The data which is used in the arithmetic and logic unit 83 is provided by the registers 80, 81 and 82, a Q register (not shown) which is used in connection with multiplication and division operations, miscellaneous other registers in processor 30, memory 11, or cache 35 if the required data is in the cache, as well as from other sources in the data processing system, as is known in the art.

Arithmetic and logic unit 83 receives data to be processed through two input terminals, namely an A IN input terminal and a B IN input terminal, processes the data in accordance with ALU CTRL control signals from the control microword, and transmits processed data through a W OUT write output terminal The sources of input data are all connected to the A IN and B IN input terminals in a wired-OR configuration. The control microword from control circuit 40 (FIG. 1) determines which of the sources of data which are actually to be transmitted to the A IN and B N input terminals, and which of the possible storage locations into which the processed data will be stored. In particular, in one embodiment, sources of data for the A IN input terminal includes all of the registers in sets 80, 81, and 82, selected miscellaneous registers in the processor and the memory 11 or cache 35. On the other hand, the sources of data for the B IN input terminal includes only registers in set 82 and selected other miscellaneous processor registers. The processed data may be written into any of the locations which may otherwise be sources of data.

Accordingly, the general purpose registers 80 receive two sets of control signals, namely a set of A EN GPR "A" enable general purpose register control signals and a set of W EN GPR write enable general purpose register control signals. If the A IN input of the arithmetic and logic unit 83 is to receive the contents of a general purpose register, a corresponding one of the A EN GPR "A" enable general purpose registers control signals will be asserted which enables the contents of that general purpose register to be transmitted to the A IN input terminal of the arithmetic and logic unit 83. Similarly, if the output of the arithmetic and logic unit 83 is to be loaded into one of the general purpose registers 80, one of the W EN GPR write enable general purpose register control signals corresponding to that general purpose register will be asserted.

The temporary register set 81 and working register set 82 receive similar control signals. In particular, the temporary register set 81 receives a set of A EN TEMP "A" enable temporary control signals for enabling the contents of selected temporary registers to be transferred to the A IN input terminal of arithmetic and logic unit 83. In addition, a set of W EN TEMP write enable temporary control signals enables the processed data from the W OUT output terminal of arithmetic and logic unit 83 to be stored in a selected temporary register in temporary register set 81.

The working register set 82 receives a set of A EN WR and B EN WR "A" and "B" enable working register control signals for enabling the contents of the selected working registers to be transferred to the A IN and B IN input terminals respectively. In addition, the working register set 82 receives a set of W EN WR write enable working register control signals for enabling the processed data from arithmetic and logic unit 83 to be stored in a selected working register. Similar control signals (not shown) are generated for the other sources of data for the A IN and B IN input terminals of arithmetic and logic unit 83 and the locations into which the processed data may be stored.

Figure 3A:
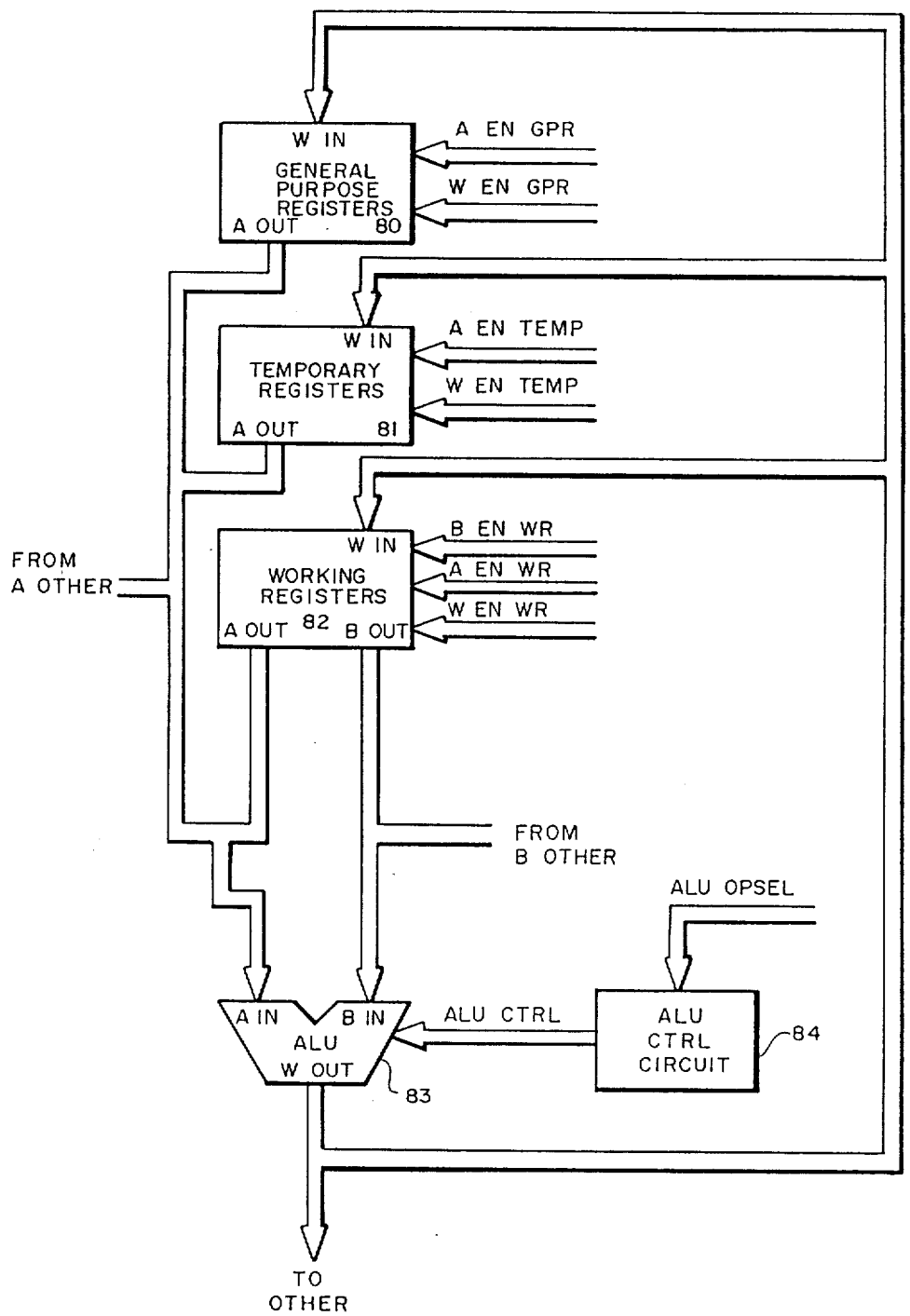
FIGS. 3A, 3B and 3C, are block diagrams of a portion of the processor depicted in FIG. 1B particularly relating to the transfer of information through the data path.
Figure 3B:
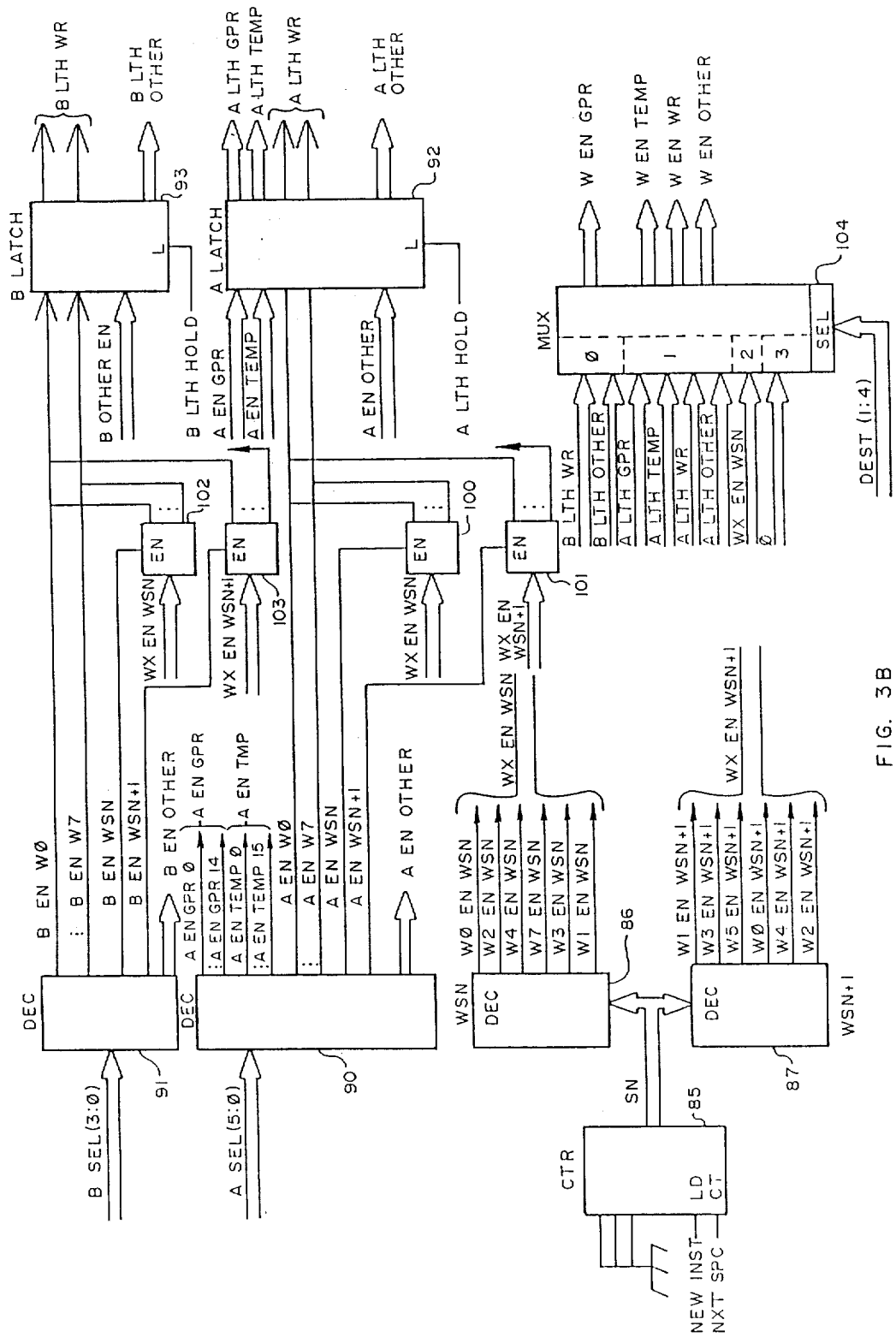
Figure 3C:
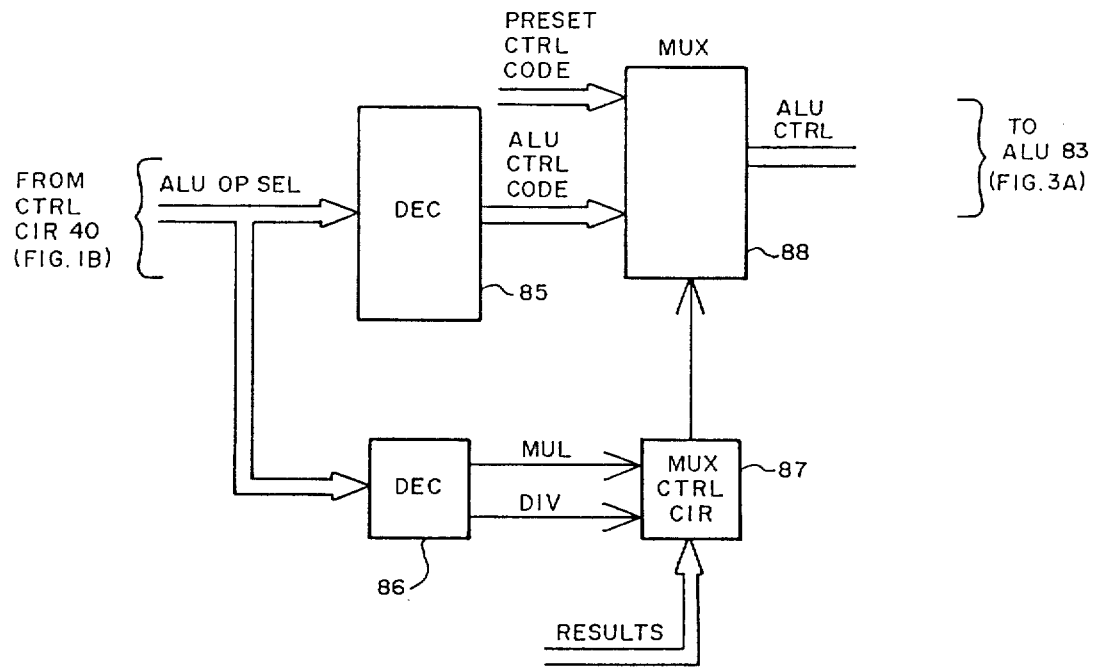

FIG. 3B depicts a logic diagram of circuitry which generates the various register control signals depicted in FIG. 3A, as well as the other control signals which are not shown. Preliminarily, the control microword includes three fields which define signals which control the sources of the signals transferred to the A IN and B IN input terminals of the arithmetic and logic unit 83, and for controlling the destinations of the signals from the W OUT output terminal. In particular, the control microword includes a field which defines A SEL (5:0) "A" select control signals, B SEL (3:0) "B" select control signals, and DEST (1:0) destination (that is, write) select control signals.

The control circuit 40 (FIG. 1), asserts a NEW INST new instruction signal when it starts processing on a new instruction, and a NXT SPC next specifier signal when it begins decoding each operand specifier. With reference to FIG. 3B, in response to the NEW INST new instruction signal from control circuit 40, a counter 85 is initialized. Each time an operand specifier is decoded, the control circuit asserts the NXT SPC next specifier signal, enabling the counter to advance. The counter 85 generates a binary encoded signal SN specifier number which identifies the operand specifier being decoded.

In response to the SN specifier number signal, two decoders 86 and 87 generate output signals WX EN WSN (X is 0, 2, 4, 7, 3, 1, in the order in which the signals from counter 85 are generated) and WX EN WSN+1 (X is 1, 3, 5, 0, 4, 2), respectively. Generally, operands are transferred into the working register set 82 from elsewhere in the digital data processing system before an arithmetic or logic operation is performed on it, and the WX EN WSN and WX EN WSN+1 signals relate to the order in which the operands are loaded into the respective working registers. If each operand will fit into a working register, the working registers are loaded in response to the WX EN WSN signals. However, if an item of data requires more space than is provided by one working register, part of it is loaded into the working register identified by the WX EN WSN signal and the remainder is loaded into the working register identified by the WX EN WSN+1 signal.

For example, if in executing an instruction each operand will fit into a single working register, the first operand is transferred into register 0 in the working register set 82, the second into register 2, the third into register 4, and so forth, in the order identified by decoder 86 In the specific embodiment described herein, a maximum of six operands may be used in executing an instruction. If each operand requires two working registers, the first operand is transferred into registers 0, as determined by decoder 86, and 1, as determined by decoder 87.

A decoder 90 receives the A SEL (5:0) "A" select control signals and generates in response to the encoding of those control signals a number of A EN XX enabling signals (XX refers to GPR 0 through GPR 14, TEMP 0 through TEMP 15, W0 through W7, WSN, WSN+1, and OTHER, where "OTHER" relates to selected other registers in the processor 30, including the aforementioned Q register). Similarly, a decoder 91 receives the B SEL (3:0) "B" select control signals and generates in response to the encoding of those control signals a number of B EN XX enabling signals (XX refers to W0 through W7, WSN, WSN+1, and OTHER, where "OTHER" relates to selected other registers in the processor 30) on respective output signal lines.

The A EN WSN enabling signal is coupled to a set of gated drivers 100 which gate th WX EN WSN enable write specifier number signals from decoder 90 and allow them to be coupled onto the respective signal lines which carry the A EN WX (X is 0, 2, 4, 7, 3 and 1) signals from decoder 90. Thus, if in response to the A SEL (5:0) "A" select signals the decoder 90 asserts the A EN WSN enable working register specifier number signal, the drivers 100 energize the signal line which carries the W X EN WSN signal that is then being asserted by the decoder 86. Gated drivers 101, controlled by the A E WSN+1 enabling signal, do the same for the WX EN WSN+1 signals generated by decoder 87. In addition, gated drivers 102 and 103, controlled by the B EN WSN and B EN WSN+1 enabling signals do the same for the WX EN WSN and WX EN WSN+1 signals in connection with the B EN W0 through B EN W7 enabling signal lines.

In addition, the output signals from decoders 90 and 91 and drivers 100 through 103 are coupled to latches 92 and 93. The latches 92 and 93 couple the conditions of the input signal to their respective output terminals when the A LTH HOLD and B LTH HOLD latch hold signals are negated and latch the conditions of the respective signal lines when the A LTH HOLD and B LTH HOLD latch hold signals are asserted. The control circuit 40 asserts the A LTH HOLD and B LTH HOLD latch hold signals when the signals on the respective signal lines have become stable to be used in generating the various W EN XX write enabling signals, so that the control circuit can proceed to generate and use a new control microinstruction, which might otherwise cause outputs of the decoders 90 and 91 to change and the signals on the signal lines to vary.

The signals latched in latches 92 and 93 are coupled to respective sets of input terminals of a multiplexer 104. In addition, multiplexer 104 has a third set of input terminals which receive the WX EN WSN signals from decoder 86, and a fourth set of input terminals which receive negated level signals. A selected set of input terminals receives the DEST (1:0) destination signals from the control circuit 40, the DEST (1:0) destination signals being from the control microinstructions. The two DEST (1:0) destination signals selects one of the four sets of input signals to be coupled to the output and provide the required W EN XX (XX refers to GPR, TEMP, WR, and OTHER) write enabling signals. Accordingly, the write enabling signals are selected in response to the two DEST (1:0) destination signals, which are far fewer signals that would otherwise be required to select the large number of possible destinations for the processed data.

As noted above, the operations performed by arithmetic and logic unit 83 (FIG. 3A) are controlled by ALU CTRL signals from ALU control circuit 84, which, in turn, is controlled by ALU OP SEL operation select signals from the control circuits 40 (FIG. 1B) of processor 30. With reference to FIG. 3C, the ALU control circuit 84 includes a decoder 85 in the form of a programmable logic array circuit which generates ALU CTRL CODE control code signals in response to the ALU OP SEL operation select signals. In addition, a decoder 86 receives the ALU OP SEL operation select signals and generates an MUL multiply signal or a DIV divide signal in response to selected encodings of the ALU OP SEL operation select signals.

By way of background, since the arithmetic and logic circuit 83 does not directly perform multiplication or division operations, one specific embodiment performs a multiplication operation, when specified by a program instruction, by an implementation of a known sequential add-shift multiplication algorithm. The same embodiment performs a division operation, when specified by a program instruction, by an implementation of a known sequential shift-subtract/add non-restoring division algorithm.

In the multiplication algorithm, the control circuits 40 generate a series of ALU OP SEL operation select signals which enable the arithmetic and logic unit 83 to perform addition or pass operations (in a pass operation, the data signals at one input terminal of the arithmetic and logic unit are transmitted to the output terminal) the results of which are stored in the aforementioned Q register (not shown). In the division algorithm, the ALU OP SEL operation select signals enable the arithmetic and logic unit 83 to perform addition or subtraction operations, the results of which are also stored in the Q register. The selection of which operation is to be performed, that is, whether the addition or pass operation is to be performed for the multiplication program instruction or the addition or subtraction operation is to be performed for the division program instruction, is based on a portion of the result of the previous operation in the series.

To avoid delaying the generation of the ALU OP SEL operation select signals by the control circuits 40 (FIG. 1B) until after the results of the previous operation have been determined, the ALU control circuit 84 includes a circuit for generating at least some of the ALU CTRL control signals if the ALU OP SEL operation select signals identify the MUL or DIV operations. The decoder 85 generates some of those signals and transmits them as the ALU CTRL CODE control code signals, which are coupled to one input of a multiplexer 88, the output signals of which comprise the ALU CTRL control signals which control the arithmetic and logic unit 83.

The second input of the multiplexer 88 receives PRESET CTRL CODE preset control code signals. With reference to the previous paragraph, since the multiply and divide operations both include an addition step, the PRESET CTRL CODE preset control code signals identify the addition operation. If the ALU OP SEL signals identify the MUL operation, the ALU CTRL CODE control code signals identify the arithmetic and logic unit's pass function. If, on the other hand, the ALU OP SEL operation select signals identify the DIV divide operation, the ALU CTRL CODE control code signals identify the subtract operation.

The second decoder 86 also receives the ALU OP SEL operation select signals from the control circuit 40 (FIG. 1B) and asserts an MUL multiply signal when they identify the MUL multiply operation, and a DIV divide signal when they identify the DIV divide operation. The MUL multiply and DIV divide signals, in turn, control a multiplexer control circuit 87, which receives RESULTS signals from other circuits representing the portion of the prior results which determines the operations to be performed, as is known in the art. In response to the RESULTS signals, and the MUL multiply and DIV divide signals from decoder 86, the multiplexer control circuit 87 generates a MUX SEL multiplexer select signal which controls multiplexer 88.

In particular, if the decoder 86 generates a MUL multiply signal and the RESULTS signals indicate that the addition operation is to be performed, the multiplexer control circuit 87 generates a MUX SEL multiplexer select signal which couples the PRESET CTRL CODE preset control code signals to the arithmetic and logic unit 83, enabling it to perform an addition operation. Similarly, if the decoder 86 generates a DIV divide signal, and the RESULTS signals indicate that the addition operation is to be performed, the MUX SEL multiplexer select signal is generated which couples the PRESET CTRL CODE preset control code signals to the arithmetic and logic unit 83 to enable it to perform an addition operation.

On the other hand, if (1) the decoder 86 generates a MUL multiply signal and the RESULTS signals indicate that the pass operation is to be performed, or (2) the decoder 86 generates a DIV divide signal and the RESULTS signals indicate that the subtract operation is to be performed, the MUX SEL multiplexer select signal enables the multiplexer 88 to couple the ALU CTRL CODE signals from decoder 85 to its output as the ALU CTRL signals which control the arithmetic and logic circuit 83. When decoder 86 generates neither a MUL multiply signal or a DIV divide signal, the MUX SEL multiplexer select signal also enables the multiplexer 88 to couple the ALU CTRL CODE signals from decoder 85 to its output as the ALU CTRL control signals for controlling th arithmetic and logic circuit 83.

It will be appreciated that the circuit depicted in FIG. 3C can, by appropriate selection of the decoder 86, multiplexer 88 and multiplexer control circuit 87, also be used in connection with other arithmetic and logic unit operations which depend, in whole or in part, on the results of the preceding operation. The circuit facilitates reduction in the time between arithmetic and logic operations in such cases, since the control circuits 40 does not have to wait until the results of an operation have been determined before generating the ALU OP SEL operation select signals for the succeeding operation.

Match Verification Circuitry For Translation Buffer 260 In Memory Management Circuit 37

In a system including CPU 10 (FIG. 1), a virtual memory arrangement is used in which each program is deemed to be allocated an entire memory space, which may be larger than the physical memory space provided by memory 11. When the processor 30 needs to access a particular location in the virtual memory space, the required portions of the virtual memory space are shifted into and out of the physical memory 11 as they are needed, with the portions of the virtual memory space which are not in physical memory 11 being stored in a mass storage device, typically a disk storage unit.

A portion of the processor 30, namely the memory management circuit 37, performs a translation between the address in the virtual memory space, which is termed the "virtual address", and the physical address in the physical memory 11, using entries in a translation page table (not shown), which is also stored in memory 11. The procedure for translating from virtual addresses to physical addresses in a system which incorporates a virtual memory is well known, and will not be described herein.

To speed up the translation from virtual to physical addresses, the memory management circuit 37 includes a translation buffer 260 which stores a selected number of page table entries which have been recently used in connection with a translation. The circuits for the translation buffer 260 are depicted in block diagram form in FIG. 4A, and more detailed logic diagrams of the translation buffer 260 are depicted in FIGS. 4B-1 and 4B-2.

Figure 4A:
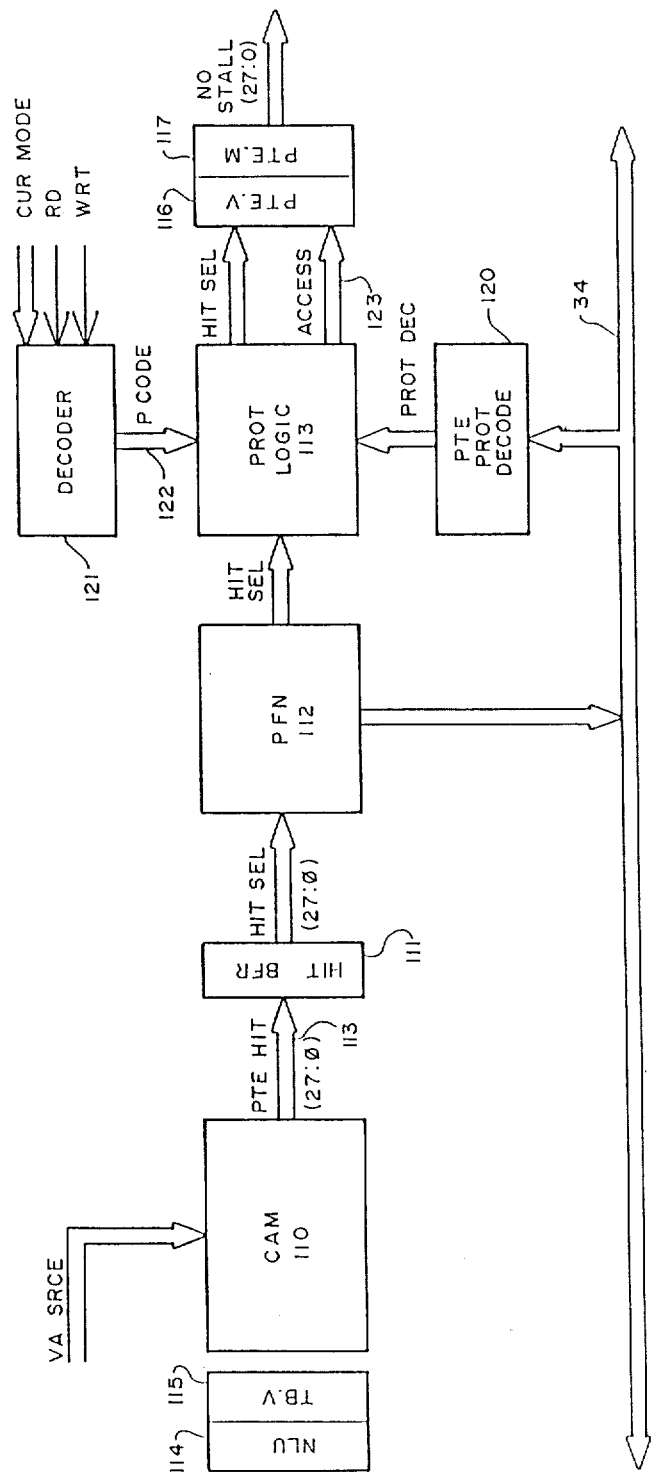
FIG. 4A is a detailed block diagram.
Figures 2, 4B:
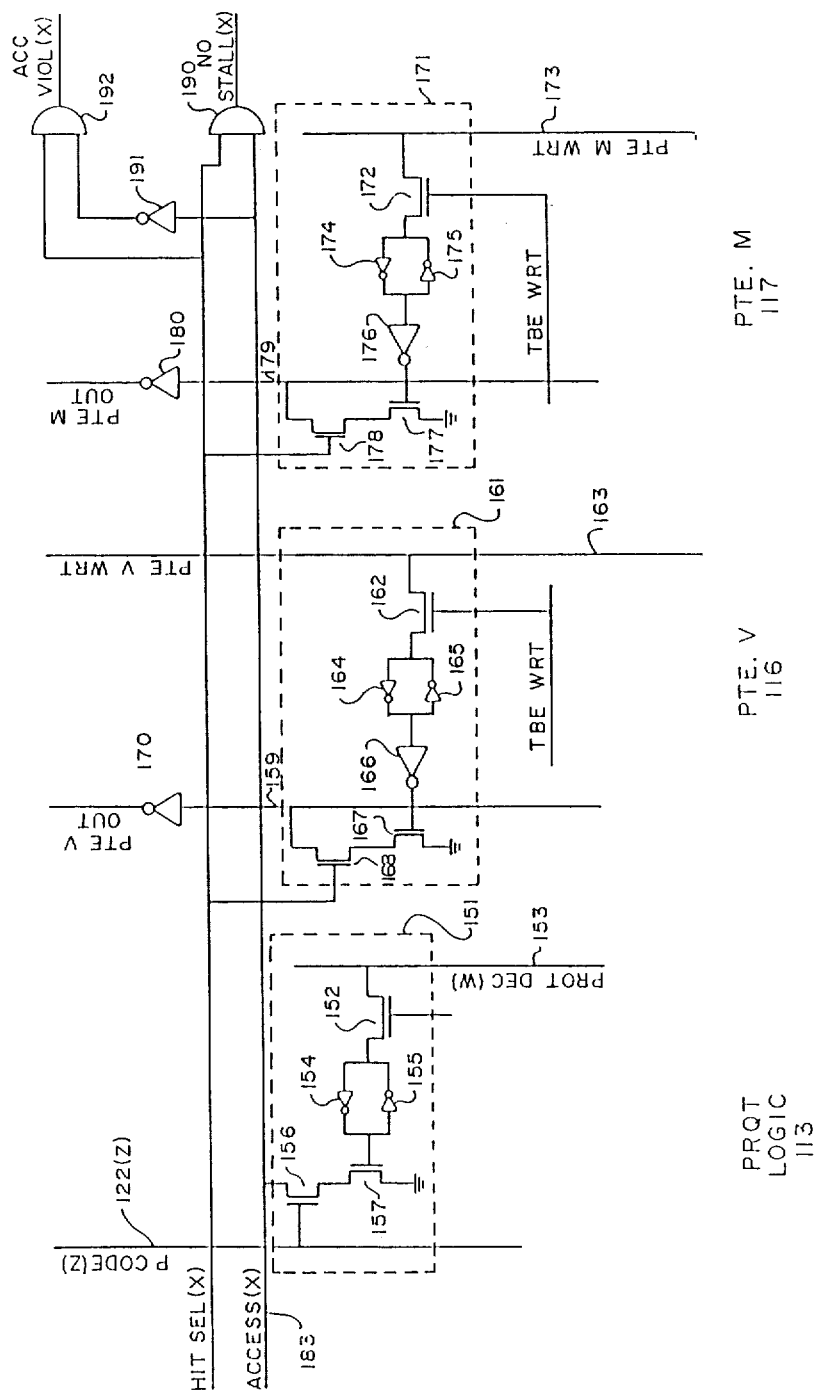

With reference to FIG. 4A, the translation buffer 260 includes a content addressable memory 110 having a plurality of entries which stores the high order portion of a virtual address, a hit buffer 111, and a page frame number storage circuit 112. The high order portion of the virtual address identifies a "page" in the virtual memory space, the page having a predetermined number of consecutive storage locations. The page frame number storage circuit includes the same number of entries as the content addressable memory. Each entry in the page frame number circuit is associated with one entry in the content addressable memory, and stores the high order portion, or page frame number, of the physical address, corresponding to the high order portion of the virtual address in the content addressable memory. In one embodiment, both the content addressable memory and page frame number storage circuit contain twenty eight entries.

The translation buffer 260 also includes a protection logic circuit 113 which also includes twenty eight entries, each associated with one entry in the content addressable memory. Each entry in the protection logic circuit stores a decoded protection code representative of the access rights of the program to the contents of the storage locations identified by the contents of the corresponding entry in the content addressable memory 110.

In addition, the translation buffer 260 has four sets of flags, namely an NLU not last used flag set 114, a TB.V translation buffer 260 valid flag set 115, a PTE.V page table entry valid flag set 116 and a PTE.M page table entry modified flag set 117. Each entry in the content addressable memory 110 is associated with one NLU not last used flag in set 114, one TB.V translation buffer 260 flag in set 115, one PTE.V page table entry valid flag in set 116, and one PTE.M page table entry modified flag in set 117. The NLU not last used flag set 114 and TB.V translation buffer 260 valid flag set 115 are used for controlling the operation of the translation buffer. In particular, the NLU flag set 114 is used in connection with replacement of entries in the translation buffer 260 as when a new page table entry is received from the memory 11. The flags of the translation buffer 260 entries which were not immediately previously used are set, and they may be replaced by a new entry. The TB.V translation buffer 260 valid flags 115 indicate that the corresponding entries in the content addressable memory 110 and page frame number circuit 112 are valid, that is, that they can be used.

The remaining flags form part of the page table entries which are retrieved from memory 11. The PTE.V page table entry valid flags 116 indicate whether the corresponding page table entry is valid and can be used. The PTE.M page table entry modified flags 117 indicates whether the corresponding pages have been modified; if a page has not been modified when the locations in physical memory 11 are used for another page in the virtual address space, it is not stored on the disk or tape.

When the processor 30 (FIG. 1) is to access memory using a particular virtual address, it first determines whether the translation buffer 260 contains an entry in the content addressable memory 110 corresponding to the high order portion of the virtual address. AVVA SRCE virtual address source signal, representing the high order portion of a virtual address, is transmitted to the content addressable memory 110. If an entry in the content addressable memory 110 corresponds to the VA SRCE virtual address source signal and if the associated flag in the TB.V translation buffer 260 valid flag set 115 is in the set condition, indicating that the entry is valid, a corresponding one of the PTE HIT (27:0) page table entry hit signals is asserted in lines 113. Hit buffers 111 buffer the PTE HIT (27:0) page table entry hit signals and time them in response to internal timing signals. If one of the PTE HIT (27:0) page table entry hit signals is asserted at the proper time, a corresponding HIT SEL (27:0) hit select signal is asserted. The asserted one of the HIT SEL (27:0) hit select signal enables the corresponding one of the twenty eight entries in the page frame number storage circuit 112 to be transferred to the internal bus 34.

The translation buffer 260 also includes a protection logic circuit 113, which includes twenty eight entries each storing, in decoded form, bits representing the access rights of the program to the contents of the page identified by the page frame number in the corresponding entry in page frame number storage circuit 112. Each page table entry contains, in addition to the page frame number which is stored in the page frame number circuit 112, a protection field which identifies the lowest operating protection level mode at which the processor 30 is operating at which the page can be accessed for read or write operations. The decoder 120 receives the protection field and generates the decoded protection field bits, which are stored in the protection logic circuit when the corresponding entries in the content addressable memory 110 and page frame number circuit 112 are loaded in the translation buffer 260 depicted in FIG. 4A.

Specifically, one embodiment provides four operating protection level modes, termed (in decreasing order of privilege) kernel (K), executive (E), supervisor (S) and user (U). If a page can be accessed in a read or write operation when the processor 30 is running in an operating privilege level mode, it can be accessed for the same read or write operation when the processor 30 is operating at higher operating privilege level mode. In that embodiment, the encoded protection values from the page table entry and values of the corresponding decoded bits generated by the decoder circuit 120, for storage in the protection logic 113, are as follows:

| ENCODED PROT. FIELD | ACCESS RIGHTS | | | | DECODED PROT FIELD |
|---|---|---|---|---|---|
| | K | E | S | U | |
| 0000 | — | — | — | — | 0000 0000 |
| 0001 | — | — | — | — | 0000 0000 |
| 0010 | RW | — | — | — | 1000 1000 |
| 0011 | R | — | — | — | 1000 0000 |
| 0100 | RW | RW | RW | RW | 1111 1111 |
| 0101 | RW | RW | — | — | 1100 1100 |
| 0110 | RW | R | — | — | 1100 1000 |
| 0111 | R | R | — | — | 1100 0000 |
| 1000 | RW | RW | RW | — | 1110 1110 |
| 1001 | RW | RW | R | — | 1110 1100 |
| 1010 | RW | R | R | — | 1110 1000 |
| 1011 | R | R | R | — | 1110 0000 |
| 1100 | RW | RW | RW | R | 1111 1110 |
| 1101 | RW | RW | R | R | 1111 1100 |
| 1110 | RW | R | R | R | 1111 1000 |
| 1111 | | | | | |

(0 = negated, 1 = asserted, R = read access, W = write access "—" = neither read nor write access)

It will be appreciated that the decoded values represent an eight-bit code, with the four left-hand bits representing the operating privilege level modes in which the locations identified by the associated page frame numbers can be read, and the right-hand bits representing the operating privilege level modes in which the locations identified by the associated page frame numbers can be written. Within each four-bit group, the bits are related to one of the operating privilege level modes. Specifically, the bits, from left to right within each four-bit group, are related to the operating privilege level modes of decreasing privilege.

When the translation buffer 260 depicted in FIG. 4A is being used in translating a virtual address to a physical address, contemporaneous with the transmission of the VA SRCE virtual address source signals to the content addressable memory, another decoder 121 receives a CUR MODE current privilege level mode signal, an asserted RD read signal if the operation is a read operation or an asserted WRT write signal if the operation is a write operation. The CUR MODE current mode signal identifies the current protection level operating mode in which the processor 30 is operating.

In response, the decoder 121 asserts one of eight P CODE (7:0) protection code signals on corresponding signal lines 122 which identify the current read or write operation in conjunction with the current operating protection level mode. That is, each of the four high order signals in the P CODE (7:0) protection code signals is associated with the four operating protection level modes in conjunction with the read operation, and the four low order signals are associated with one of the four operating protection level mode in conjunction with the write operation, as follows:

| OPERATING MODE | OPERATION | P CODE (7:0) SIGNALS |
|---|---|---|
| KERNEL | READ | 1000 0000 |
|  | WRITE | 0000 1000 |
| EXECUTIVE | READ | 0100 0000 |
|  | WRITE | 0000 0100 |
| SUPERVISOR | READ | 0010 0000 |
|  | WRITE | 0000 0010 |
| USER | READ | 0001 0000 |
|  | WRITE | 0000 0001 |

(0 = negated, 1 = asserted)

The protection logic circuit compares the P CODE (7:0) signals to the contents of the protection logic 113. If the asserted P CODE (7:0) protection code signal corresponds to at least one set bit in the decoded protection field stored in an entry in the protection logic 113, one of the ACCESS (27:0) access signals is asserted on one of lines 123 associated with the entry. On the other hand, if the asserted P CODE (7:0) protection code signal does not correspond to at least one set bit in the decoded protection field in one entry, none of the ACCESS (27:0) access signals are asserted.

The ACCESS (27:0) access signals are ANDed with corresponding HIT SEL (27:0) hit select signals to generate NO STALL (27:0) signals, each of which is associated with one of the entries in the translation buffer. The processor 30 uses the NO STALL (27:0) signals to determine whether an entry in the translation buffer 260 contains the required page frame number and, if so, whether the processor is attempting to perform a read or write operation on a page in memory 11 in an operating privilege level mode which is insufficient. If at least one of the NO STALL (27:0) signals is asserted, an entry in the translation buffer 260 contains the required page frame number and the processor 30 does have the required operating privilege level mode.

FIGS. 4B-1 and 4B-2 depict detailed logic diagrams of a portion of one entry in various of the circuits in the translation buffer 260 depicted in FIG. 4A. In particular, each entry in the content addressable memory 110, page frame number circuit 112, and protection logic 113 include a plurality o identical logic and memory cells, with each cell storing one bit of the associated high order virtual address, page frame number and decoded protection field. Since the cells are identical, only one cell from each of circuits 110, 112 and 113 is shown in FIGS. 4B-1 and 4B-2.

With reference to FIG. 4B-1, content addressable memory 110 includes a CAM cell 131 which is connected to a line 132 to receive one of the VA SRCE high-order virtual address source signals, specifically the VA SRCE (Y) signal, from circuits 251 (FIG. 1B) within processor 30. Circuits 251 also provide a signal VA SRCE (Y) COMP signal on a line 132A which is generally complementary to the VA SRCE (Y) except as described below. The other CAM cells in the entry including CAM cell 131 receive other VA SRCE signals in parallel, with all of the VA SRCE signals comprising the entire high-order portion of the virtual address transmitted to content addressable memory 110 (FIG. 4A). All of the entries in the content addressable memory 110 receive the VA SRCE virtual address source signals at the same time.

The VA SRCE virtual address source signals may be directed to content addressable memory 110 for one of two purposes, namely, to either write an entry in the translation buffer, or to obtain an address translation. While writing an entry in the translation buffer, other circuits within the processor 30 transmit the high-order bits of the virtual address as VA SRCE virtual address source signals and asserts a TBE WRT translation buffer 260 entry write signal associated with the translation buffer 260 entry to be written. In response, pass transistors 133 and 133A in cell 131 are turned on, coupling the signal on lines 132 and 132A to a flip-flop comprising inverters 134 and 135. If the address bit on line 132 is asserted (and its complement on line 132A negated), the output of inverter 134 will be low and the output of inverter 135 will be high. If the address bit on line 132 is negated, the output of inverter 134 will be high and the output of inverter 135 will be low.

The page frame number circuit also includes a number of entries each including a number of cells, one cell 140 being depicted in FIG. 4B-1. If the TBE WRT translation buffer 260 write signal is asserted, indicating a write operation to the translation buffer 260 entry, a pass transistor 142 is turned on, coupling a PFN (Z) page frame number (Z) signal on a line 143 from other circuits within the processor 30 to a flip-flop comprising inverters 144 and 145. The conditions of the signals from inverters 144 and 145 in response to the conditions of the PFN (Z) signal are similar to the conditions of the signals from inverters 134 and 135. The PFN (Z) page frame number (Z) signal is one bit of the page frame number stored in the entry including cell 141.

Similarly, the protection logic includes a number of entries each including a number of cells, with one cell 151 being depicted in FIG. 4B-2. If the TBE WRT translation buffer 260 write signal is asserted, a pass transistor 152 is turned on, coupling a PROT DEC (W) decoded protection code signal from decoder circuit 120 to a flip-flop comprising inverters 154 and 155. The conditions of the inverters 154 and 155 in response to the conditions of the PROT DEC (W) decoded protection signals are similar to the conditions of the signals from inverters 134 and 135.

The PTE.V and PTE.M page table entry valid and modified flags 116 and 117 includes cells 161 and 171, respectively, which are similar in structure. Flag 116 includes a pass transistor 162 which, when turned on by the asserted TBE WRT translation buffer 260 entry write signal, couples a PTE V WRT page table entry valid write signal from other circuits within processor 30 for storage in a flip-flop comprising inverters 164 and 165. Flag 117 also includes a pass transistor 172 which, when turned on by the TBE WRT translation buffer entry write signal couples a PTE M WRT page table entry modified write signal for storage in a flip-flop comprising inverters 164 and 165.

The NLU flag 114 (FIG. 4A) has no part in the translation operation, and is not depicted in FIGS. 4B-1 and 4B-2. The TB.V translation buffer 260 valid flags are similar in structure and connection to the PTE.V page table entry flags and will not be discussed further.

As described above, the circuits depicted in FIG. 4B-1 and 4B-2 are also used in connection with translating virtual addresses to physical addresses. In the following description, it will be assumed that the high-order portion of the virtual address has been stored in the entry including cell 131 (FIG. 4B-1), the corresponding page frame number has been stored in the entry including cell 141, the corresponding decoded protection field bits from decoder 151 have been stored in the cell including cell 151, and the corresponding PTE.V page table entry flag has been conditioned to indicate the page table entry is valid.

With reference to FIG. 4B-1, immediately prior to a translation, a pre-charge voltage is applied to line 143, to a line 181, which carries a PTE HIT (X) page table entry signal, and a line 183 (included in the lines 123, FIG. 4A) which carrie an ACCESS (X) access signal, both of which are associated with a single entry in the translation buffer. During the pre-charge time, both the VA SRCE (Y) and the VA SRCE (Y) COMP signals from virtual address source circuits 251 (FIG. 1B) are negated (in a low voltage condition) to turn off transistors 136 and 138 to permit the pre-charge operation to take place. In addition, a low voltage is applied to a line 182 which carries a HIT SEL (X) hit select signal also associated with the entry. Line 181 is connected to all of the cells 131 in one entry in content addressable memory 110, line 182 is connected to all of the cells 141 in the associated entry in page frame number circuit 112, and line 183 is connected to all of the cells 151 in the associated entry in protection logic circuit 113.

After the lines have been pre-charged, other circuits within processor 30 transmit the VA SRCE virtual address source signals to the content addressable memory 110 (FIG. 4A). The cell 131 includes a comparator comprising transistors 136 through 139 which compare the condition of the signal on the line 132 with the conditions of the inverters 134 and 135, representing the condition of the signal on line 132 which was previously latched when the entry was written. Specifically, if the VA SRCE (Y) virtual address source signal latched by the flip-flop comprising inverters 134 and 135 was previously asserted, the output of inverter 134 will be low, and the output of inverter 135 will be high. Thus, inverter 134 will turn off transistor 139 and inverter 135 will turn on transistor 137. If the VA SRCE (Y) signal is now asserted, transistor 138 will be turned on and an inverter 140 will turn off transistor 136. Since transistors 136 and 139 are turned off, there is no current path between line 181 and ground. Thus, the line remains at the pre-charge voltage level.

Similarly, if the VA SRCE (Y) virtual address source signal latched by the flip-flop comprising inverters 134 and 135 was previously negated, the output of inverter 134 will be high and the output of inverter 135 will be low. Thus, inverter 134 will turn on transistor 139 and inverter 135 will turn off transistor 137. If the VA SRCE (Y) signal is now negated during a translation, transistor 138 will be turned off and inverter 140 will turn on transistor 136. Since transistors 137 and 138 are turned off, there is no current path between line 181 and ground. In this condition, the line 181 also remains at the pre-charge voltage level.

If the VA SRCE (Y) virtual address source signal latched by the flip-flop comprising inverters 134 and 135 was previously asserted, transistor 139 will be off and transistor 137 will be on. If the VA SRCE (Y) signal is now negated during a translation, the transistor 138 will be turned off and transistor 136 will be turned on. Thus, a current path exists between line 181 and ground through transistors 136 and 137, and so the voltage on line 181 is reduced to the ground voltage level. It will be appreciated that, if the previously latched VA SRCE (Y) virtual address source signal was negated, and is asserted during a translation, a current path will exit between line 181 and ground through transistors 138 and 199, so that the voltage on line 181 will also be reduced to the ground voltage level.

Accordingly, if the condition of the VA SRCE (Y) virtual address source signal during a translation is the same as when the entry was written, the cell 131 isolates line 181 from the ground voltage level so that it may remain at the pre-charge voltage level; that is, if the two conditions are the same in a cell 131, the cell permits the PTE HIT (X) page table entry hit signal to be asserted. On the other hand, if the two conditions differ, the line 181 is pulled to a low voltage level, that is, the PTE HIT (X) page table entry hit signal is negated. Since all of the cells 131 in the entry in content addressable memory 110 are connected to the line 181, the conditions must match in all of them for the PTE HIT (X) page table entry hit signal to be asserted.

If the PTE HIT (X) signal is asserted, a transistor 184 in the hit buffer 111 is turned on. When a PH2 phase two clock signal is next asserted, a transistor 185 is also turned on, effectively coupling line 183 to the positive power supply $V_{dd}$. The asserted HIT SEL (X) hit select signal turns on a transistor 186 in cell 141 in the page frame number circuit 112, thereby coupling the output of a buffer transistor 187, representing the condition of the bit of the page frame number stored in cell 141, to line 143. The output is amplified by an amplifier 190 and coupled onto one line of bus 34.

The output of buffer transistor 187 represents the condition of the bit of the page frame number stored in cell 141. Specifically, if the bit is negated, the inverter 144 will turn on transistor 187. When the HIT SEL (X) hit select signal is asserted turning on transistor 186, a current path is formed from line 143, through transistors 186 and 187 to ground, thereby negating the PFN (Y) page frame number (bit y) signal. On the other hand, if the previously-stored bit is asserted, the inverter 144 will turn off transistor 187, so that even if transistor 186 is on, the pre-charged line 143 will remain at a high voltage level, and the PFN (Y) signal will be asserted.

Contemporaneously with the transmission of the VA SRCE virtual address source signals to the content addressable memory, the decoder 121 transmits the P CODE (7:0) protection code signals to the protection logic 113. As noted above, in one embodiment, one of the P CODE (7:0) protection code signals is asserted, to identify the current protection level mode of the processor and the operation (read or write) which is to occur. The other P CODE (7:0) protection code signals are negated.

With reference to FIG. 4B-2, cell 151 in the protection logic 113 includes a transistor 156, controlled by the P CODE (Z) protection code signal transmitted to the cell, and a transistor 157 controlled by the flip-flop comprising inverters 154 and 155. The two transistors 156 and 157 are connected in series between line 183, which carries the ACCESS (X) access signal associated with the entry.

The condition of transistor 157, that is, whether it is on or off, depends on the output of inverter 154, which, in turn, depends on the condition of the PROT DEC (W) protection decode signal when the entry was last written. Specifically, if the PROT DEC (W) protection decode signal was asserted, the output signal from inverter 154 is negated, and transistor 157 is off. On the other hand, if the PROT DEC (W) protection decode signal was negated, the output signal from inverter 154 is asserted, and transistor 157 is on.

Similarly, the condition of transistor 156 depends on the condition of the P CODE (Z) protection code signal. If the P CODE (Z) protection code signal is asserted, the transistor 156 is on, whereas if the signal is negated, the transistor 156 is off.

Transistors 156 and 157 control the condition of the line 183 and, thus, the asserted and negated condition of the ACCESS (X) signal carried thereby. If both transistors 156 and 157 are on, a current path exits between line 183 and ground through cell 151, and, accordingly, the ACCESS (X) signal is negated. On the other hand, if either transistor 156 or 157 is off, no current path exists between line 183 and ground through cell 151. If no current path exists through the other cells in the entry in protection logic 113, the ACCESS (X) signal is asserted.

It will be appreciated that cell 151 essentially performs a comparison between the previously-written PROT DEC (W) decoded protection signal previously latched by the flip-flop comprising inverters 154 and 155 and the P CODE (Z) signal provided by decoder 121 during an access request. In particular, the cell 151 negates the ACCESS (X) signal only if the P CODE (Z) signal from decoder 121 is asserted and the previously latched PROT DEC (W) decoded protection signal from decoder 120 is negated, thus indicating that the processor 30 is not operating at a sufficiently high privilege level.

The HIT SEL (X) hit select signal and ACCESS (X) signal are coupled to an AND gate 190. If both the HIT SEL (X) hit select signal and the ACCESS (X) signal are asserted, the AND gate 190 generates the NO STALL (X) signal for the translation buffer 260 entry, indicating that the processor 30 may, if the entry's TB.V translation buffer 260 valid flag in set 115 and PTE.V page table entry valid flag in set 116 are conditioned as described below. On the other hand, if no NO STALL signal is asserted, other circuits within processor 30 perform corrective action. In particular, if no HIT SEL (X) hit select signal is asserted, the other circuits may obtain a page table entry from the memory 11 (FIG. 1) and attempt a translation. Contemporaneously, the page table entry retrieved from memory 11 may be written into an entry in the translation buffer 260 (FIG. 4A), using the NLU not last used flags 114.

On the other hand, if the ACCESS (X) signal is negated, an inverter 191 couples an asserted signal to one input of an AND gate 192. If the corresponding HIT SEL (X) hit select signal is asserted, indicating the a match in the content addressable memory 110, the AND gate 192 is energized to assert an ACC VIOL (X) access violation signal, indicating that the processor 30 does not have the required operating protection level mode to perform the requested access operation. The processor can perform conventional recovery operations in response to the access violation.

As has been noted, the processor 30 also uses the conditions of the TB.V translation buffer 260 valid flags 115 and PTE.V page table entry valid flags 116 (FIG. 4A) when a NO STALL (X) signal is asserted. Since the structures of the flags are similar, only one of the PTE.V page table entry valid flags 116 will be described in detail. With reference to FIG. 4B-2, if the page table entry in the entry in the translation buffer 260 is valid, when the translation buffer 260 entry was written, the PTE V WRT page table entry valid write signal was asserted, thus setting the flip-flop comprising inverters 164 and 165, thereby setting the PTE.V page table entry valid flag. In that condition, the input of inverter 164 was at a high voltage level, and its output was at a low voltage level.

In this condition an inverter 166 maintains a transistor 167 in an on condition. The asserted HIT $EL (X) hit select signal associated with the translation buffer 260 entry turns on another transistor 168 connected in series with transistor 167 between a line 169 and ground. Thus, if both transistors 167 and 168 are turned on in cell 161, a ground level signal is applied to line 169. Inverter 170 complements the signal to a high asserted PTE V OUT page table entry valid out signal.

Line 169 is connected in common to transistors corresponding to transistor 16 in all of the cells 161 in all of the entries in the translation buffer 260 (FIG. 4A). Thus, if a HIT SEL (X) signal is asserted in any of the translation buffer 260 entries, if the PTE.V flag is set in that translation buffer 260 entry, then both transistors 167 and 168 will be on, a ground level signal will be applied to line 169.

On the other hand, if the PTE.V page table entry valid flag is clear, that is, if the previously written PTE V WRT page table entry valid write signal was negated, it will be appreciated that transistor 167 will be off, thus isolating line 169 from ground. If line 169 is pre-charged prior to the translation operation, the resulting PTE V OUT page table entry out signal from inverter 170 will be negated.

The PTE.M page table entry modified flags 117 are structured similar to the PTE.V page table entry valid flags 116, and operate in a similar manner. However, the PTE.M flag is conditioned in response to a PTE M WRT page table entry modified write signal which is only asserted when the page in memory 11 is being written. Cell 171 (FIG. 4B-2) depicts one embodiment of one of the PTE.M page table entry flags 117.

After the page frame number is transmitted by the circuit 112 (FIG. 4A), and the NO STALL signal is generated, the processor negates the PH2 clocking signal, which turns off transistor 185 (FIG. 4B-1) and asserts a PH4 clocking signal, which turns on a transistor 193. Transistor 193 couples a ground level signal onto line 182, thereby negating any HIT SEL (X) signal which may have been asserted. The processor then negates the PH4 clocking signal and the translation buffer 260 (FIG. 4A) is then ready to receive another virtual address.

It will be appreciated that the new translation buffer 260 permits a determination of whether the processor is operating in a sufficient operating privilege level mode in order to perform an access, contemporaneously with the selection and transmission of the page frame number required for the virtual to physical address translation. In prior known translation buffers, the encoded contents of the protection field were transmitted from the translation buffers with the page frame number, and a determination was made at that time whether the processor had the required operating privilege level mode to perform the operation. This delayed the processor from recognizing an access violation if it was not operating in a required operating privilege level mode to make the access.

Cache Logic

As described above, the processor 30 includes a cache memory 35 (FIG. 1B) which stores copies of at least some of the data which was most recently received from memory 11. When data then is to be retrieved from an addressed location in memory 11, the processor 30 first determines whether the cache memory 35 contains a copy of the data in the addressed location. FIG. 5 depicts a functional block diagram of circuits in cache memory 35 for determining whether the cache contains the identified data, and also for transmitting, under control of the bus interface unit 33, the data onto the internal IDAL bus 34.

Figure 5:
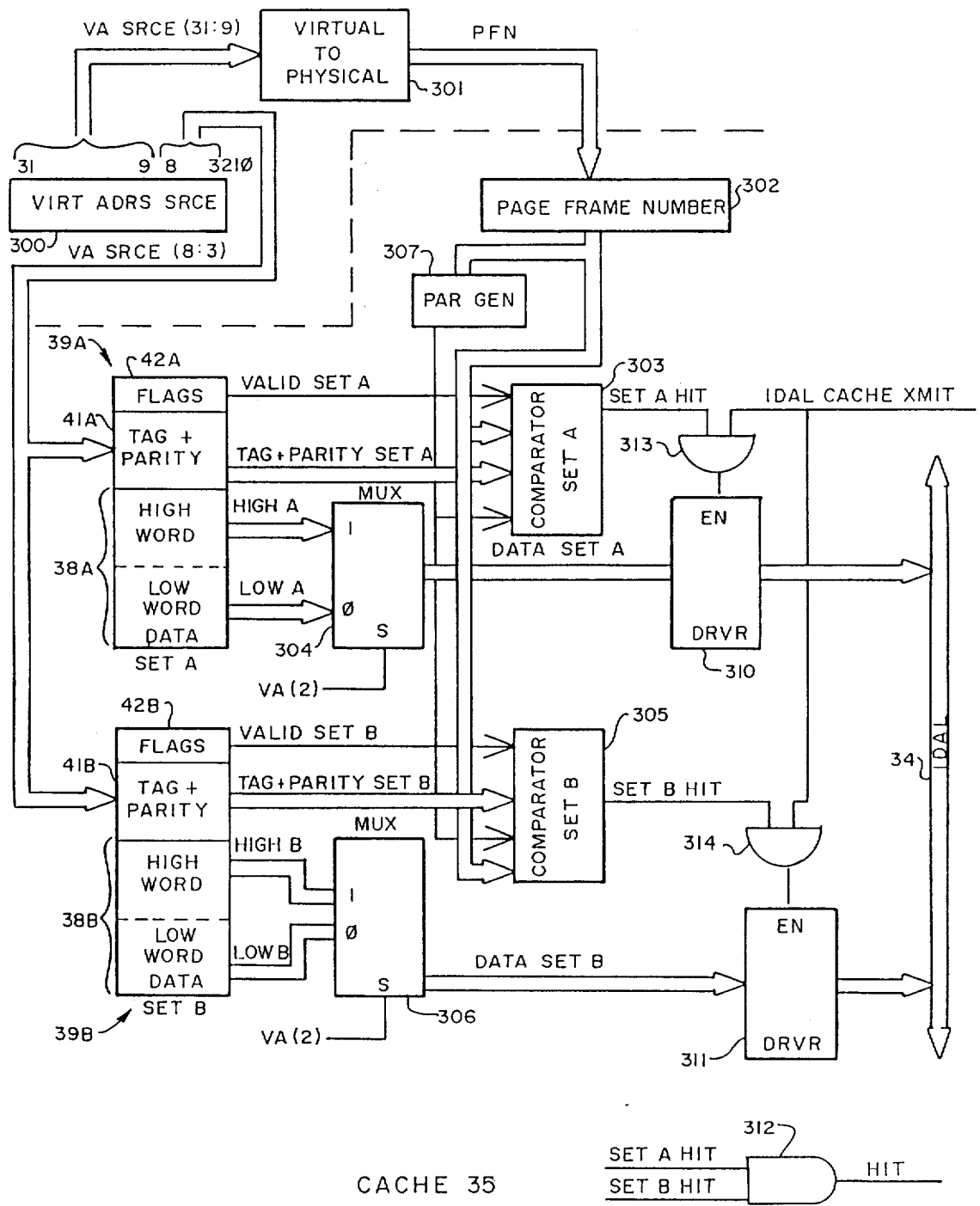
FIG. 5 is a detailed block diagram of a portion of the processor depicted in FIG. 1B particularly relating to the retrieval of data from the cache memory.

With reference to FIG. 5, the cache 35 includes two data storage sets 39A and 39B each including, in one specific embodiment, sixty-four entries divided into a flag set 42A, 42B, a tag set 41A, 41B, and a data storage area 38A, 38B. Each entry in the tag sets 41A and 41B also includes a parity bit for verifying the integrity of the tag information stored in the respective tag sets. Each entry in the data storage area 38A and 38B stores two words, or eight bytes, of data, with one word comprising a high order word, and the other word comprising a low order word.

The cache memory 35 is organized as a two-way set associative cache, in which the low-order portion of the address identifies one of the sixty-four entries in each of the data storage sets 39A and 39B. When an entry in one of the data storage sets 39A or 39B in cache 35 is written with data from memory 11, the low-order portion of the physical address identifies the entry in the data storage set into which the data is to be written, and the high-order portion of the physical address, with a parity bit, is stored in the tag set 41A or 41B.

The virtual address, in a register 300 in source registers 257 (FIG. 1B), comprises, in the described embodiment, thirty two bits, with bits (31:9) comprising the high order portion and bits (8:0) comprising the low order portion. The high order portion is transmitted as VA SRCE (31:9) virtual address source signals to translation logic 301, which generates a page frame number and transmits it to a page frame number register 302 in cache memory 35. Logic 301 may comprise the translation buffer 260 described above in connection with FIGS. 4A, 4B-1 and 4B-2, and it may also comprise other conventional mechanisms for generating the page frame number from the high-order portion of the virtual address. Bits (8:0) of the virtual address do not change during address translation.

Bits (8:3) of the low-order portion of the virtual address are transmitted from register 300 as VA SRCE (8:3) virtual address source signals to the data storage sets 39A and 39B. The VA SRCE (8:3) virtual address source signals identify one of the sixty-four entries in both of the data storage sets. In response to the receipt of the VA SRCE (8:3) virtual address source signals, the contents of the identified entry are transmitted from the respective data storage set.

Specifically, the contents of the selected entry in the data storage set A are transmitted as VALID SET A and TAG+PARITY SET A signals to a comparator 303. The high order word of the identified entry is transmitted as HIGH A signals to a multiplexer 304, and the low order word is transmitted as LOW A signals to multiplexer 304. The multiplexer is controlled by the a VA SRCE (2) virtual address source signal, corresponding to bit (2) of register 300. In response to the VA SRCE (2) virtual address source signal, multiplexer 304 couples one of the input signals as DATA SET A signals to a gated driver 310.

Similar signals are transmitted to comparator 305 and multiplexer 306 from data storage set 39B based on the entry therein identified by the VA SRCE (8:3) virtual address source signals. Multiplexer 306 is also controlled by the VA SRCE (2) virtual address source signal to couple one of the HIGH B or LOW B input signals from data storage area 38B to a gated driver 311 as DATA SET B signals.

The page frame number in register 302 is also transmitted to comparators 303 and 305. The page frame number is also transmitted to a parity generator 307, which generates a PAR parity signal which is also transmitted to comparators 303 and 305. If the page frame number from register 302 and PAR parity signal from parity generator 307 correspond to the TAG+PARITY SET A signal, and if the VALID SET A signal from flag set 41A is asserted, the comparator 303 asserts a SET A HIT signal. Similarly, if the page frame number from register 302 and PAR parity signal from parity generator 307 correspond to the TAG+PARITY SET B signal, and if the VALID SET B signal from flag set 41B is asserted, the comparator 305 asserts a SET B HIT signal.

The SET A HIT and SET B HIT signals are coupled to an OR gate 312, which generates an asserted HIT signal if either the SET A HIT or SET B HIT signal is asserted. The HIT signal is transmitted to the bus interface unit 33 to indicate that the cache memory 35 contains the data identified by the virtual address in register 300. In response, the bus interface unit 33 asserts an IDAL CACHE XMIT internal bus cache transmit signal.

The SET A HIT signal from comparator 303, when asserted, also energizes one input of an AND gate 313. If the IDAL CACHE XMIT internal bus cache transmit signal is asserted, the gated driver 310 couples the DATA SET A signals from multiplexer 304 onto the internal IDAL bus 34. Similarly, the SET B HIT signal from comparator 305, when asserted, also energizes one input of an AND gate 314, and if the IDAL CACHE XMIT internal bus cache transmit signal is asserted, the gate driver 311 couples the DATA SET B signals from multiplexer 306 onto the internal IDAL bus 34.

The arrangement of cache memory 35 depicted in FIG. 5 provides several benefits. First, while the cache memory 35 depicted in FIG. 5 is a two-way set associative cache, it will be appreciated that it may be expanded into an n-way ("n" is any integer) set associative cache very easily merely by providing additional circuits, as depicted for each set in FIG. 5, for the additional sets. In addition, by accessing the data storage sets 39A and 39B initially based on the bits (8:3) of the virtual address, which remain invariant during virtual to physical address translation, at the same time that the translation of the high order bits (31:9) is taking place to generate the page frame number, the hit or miss determination can take place very rapidly. If the required data is in the cache memory 35, the data can be expeditiously obtained therefrom, and if it is not, then the bus interface unit 33 can initiate a retrieval operation for the data very shortly after the page frame number has been generated.

Bus Interface Circuit 33

Figure 6:
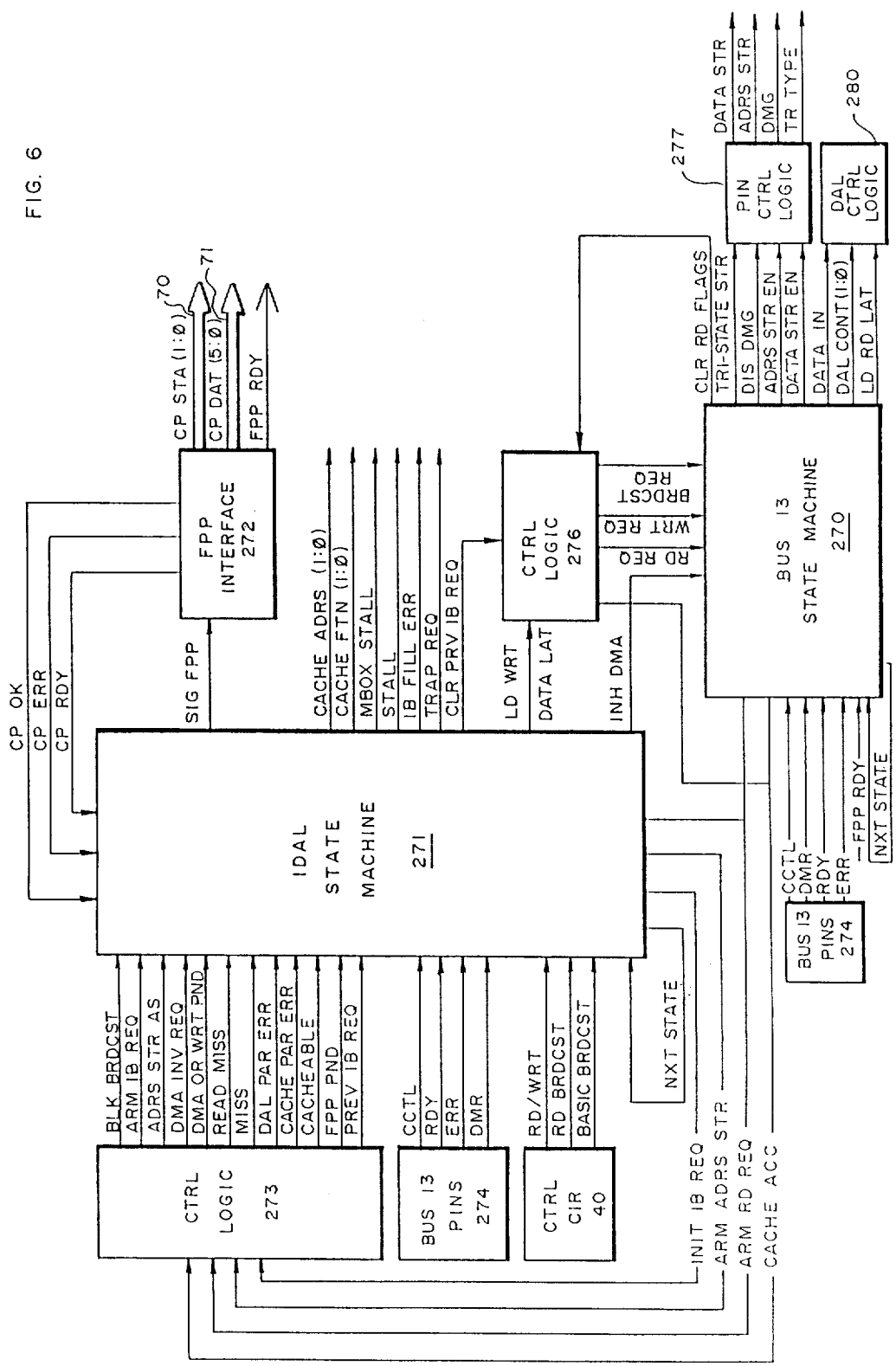
FIG. 6 is a detailed block diagram of a portion of the processor depicted in FIG. 1B particularly relating to the circuits for controlling transfers with other portions of the system.

A bus interface circuit 33 in one embodiment of the processor 30 is depicted in FIG. 6. With reference to FIG. 6, the bus interface circuit 33 includes a state machine 270 which controls bus 13 (FIG. 1A) and a second state machine 271 which controls operations over internal IDAL bus 34. The two state machines 270 and 271 operate independently except for several flags and control signals, as described below, which allow state machine 271 to indicate to state machine 270 that operations over bus 13 are required, and response signals provided by state machine 270 to indicate the completion of the operations to state machine 271.

State machine 271, which controls the internal IDAL bus 34, receives input signals from a number of sources within the processor 30, which are generally indicated by control logic 273, from several terminals on bus 13, which are generally indicated by pins 274 of bus 13, and from microinstructions from control circuit 40 (Fig. 1B). State machine 271 transmits output signals to control number of circuits within processor 30, including logic circuits 272 which control the transfers with the floating point processor 31 and several signals which control the function of the cache and the address input multiplexer 264 (FIG. 1B). In addition, output signals from state machine 271 also control logic 276 which contains flags (not shown) indicating that a read operation is pending, which is, in turn, indicated by the condition of a RD REQ read request signal, that a write operation is pending, as indicated by the condition of a WRT REQ write request signal, and that a transfer of operands from the processor 30 to the floating point processor 31 is pending, as indicated by the condition of a BRDCST REQ broadcast request signal.

Control logic 276, under control of the operating system, also can determine whether certain information received over bus 13 (FIG. 1A) during a read operation is to be stored in the cache 35 (FIG. 1B). For example, the operating system may condition processor 35 to store all information which it reads in the cache 35. Alternatively, the operating system may not permit storing processor instructions in the cache 35, and only permit storing of data to be processed in the cache. Generally, however the operating system will not permit storing information which is received from various control registers in the other portions of the system depicted in FIG. 1A in the cache 35. The control logic 276 conditions a CACHE ACC cacheable access signal to control the caching of the information received over the bus 13.

As described above, an unit external to the processor 30 may also control whether the transfer is to be cached by means of the CCTL cache control signal on line 61 (FIG. 1A)

The state machine 271, directly or indirectly through other control logic (not shown) also controls the loading of write data and read and write addresses into latches 550 through 252, and also controls the transfer of read data from input data latch 254 based on the conditions of the signals on the pins 244.

State machine 270, which controls transfers over the bus 13, receives the RD REQ read request, WRT REQ write request, and BRDCST REQ broadcast request signals from control logic 276, as well as signals from bus pins 274, and generates signals which are transmitted to logic circuits 277 which control the condition of several of the signals comprising bus 13. In addition, the state machine 270 generates signals transmitted to control logic 280, which, in turn, controls the operation of latches 250, 251, 252 and 254 and multiplexer 253 (FIG. 1B) to allow signals to be coupled onto and received from the DAL data/address lines 50 of bus 13. After a read operation has been completed, the state machine 270 also asserts a CLR RD FLAGS clear read flags signal which enables the control logic 276 to negate the RD REQ read request signal.

With this background, the operation of the bus control circuit 33 depicted in FIG. 6 will now be described. During a write operation, as enabled by control circuit 40, if the DMA OR WRT PND (DMA or write pending) signal is not asserted by control logic 273, the state machine 271 first loads the address of the location to be written into the write address latch 251 (FIG. 1B) and determines whether the location is cached in the cache 35 (FIG. 1B). If the DMA OR WRT PND signal is asserted, either another unit in the system depicted in FIG. 1A is using the bus 13 or the state machine 271 has enabled a write address and data to be loaded into the latches 251 and 250 (FIG. 1B), respectively, which has not been transferred over bus 13.

If the DMA OR WRT PND (DMA or write pending) signal is not asserted, a determination is made of whether the location to be written is cached. If the location is cached, the entry in cache 35 corresponding to that location must be updated with the new data. To determine whether the location is cached, the state machine 271 generates CACHE FTN (1:0) cache function signals enabling the cache to be read and CACHE ADRS (1:0) signals enabling the multiplexer 264 to use the physical address generated by the virtual address translation circuit 37. During this operation, the IDAL CACHE XMIT cache transmit signal (FIG. 5) is negated to inhibit the data from the cache to be coupled onto the internal data bus 34. If the location is cached, the HIT signal will be asserted by AND gate 312 (FIG. 5), which will be reflected in the condition of the MISS signal from control logic 273.

If the MISS signal is not asserted, the location to be written is cached. In response to a negated MISS signal, the state machine 271 generates CACHE FTN (1:0) cache function signals enabling a cache write operation and CACHE ADRS (1:0) cache address signals enabling the multiplexer 264 to use the address from the virtual address translation circuit 37. Simultaneously, the data written into the cache entry is stored in the write data latch 250 (FIG. 1B) and the flags in the control logic are conditioned to generate an asserted WR REQ write request signal. During this operation, the MBOX STALL signal is asserted to disable the virtual address translation circuitry from operating.

On the other hand, if the MISS signal is asserted, the location to be written is not cached. In response to the asserted MISS signal, the state machine enables the write data to be latched in the write data latch 250 (FIG. 1B) and the WRT REQ signal to be asserted by control logic 276. In addition, the CACHE ADRS (1:0) cache address signals are conditioned to increment a refresh counter 262 (FIG. 1B) and enable multiplexer 264 to couple the address to the flags 42, tags 41 and data store 38 (FIG. 1B) to permit them to be refreshed. During this operation, the MBOX STALL signal is also asserted to disable the virtual address translation circuitry from operating to prevent it from producing another physical address.

After the write operation is completed, the DMA OR WRT PND (DMA or write pending) signal is negated. This permits another address and write data to be loaded into the latches 250 and 251 (FIG. 1B). The refresh operation is also enabled The operations performed or enabled by state machine 271 during a read operation depend on whether the requested information is an instruction or data and whether or not the requested information was in cache 35 (FIG. 1B). The information is in the cache if the location identified by the address is cached and if there is no parity error on either the tag 41A, 41B, or the data 38A, 38B (FIG. 5), which would render the cache entry unusable. A read operation may be required to retrieve an instruction, in which case the control logic 273 asserts an IB REQ instruction buffer request signal. Otherwise, control circuit 40 asserts an RD read signal. If the required information is not in the cache 35, the control logic 273 also asserts a READ MISS signal. The READ MISS signal is the complement of the HIT signal depicted in FIG. 5.

In response to an asserted RD read signal from control circuit 40 or the assertion of the IB REQ instruction buffer request signal, the state machine 271 generates CACHE FTN (1:0) cache function signals which enable a cache read, and CACHE ADRS (1:0) cache address signals which enable multiplexer 264 (FIG. 1B) to use the address from virtual address translation logic 37. Simultaneously, the state machine 271 asserts the ARM ADRS STR arm address strobe signal which enables the address from the virtual address translation logic 37 to be loaded into the read address latch 252. If the operation was in response to the IB REQ signal, the state machine 271 also asserts an INIT IB REQ initiate instruction buffer request signal, which enables the control logic 273 to set a flag which, in turn, enables the assertion of a PREV IB REQ previous instruction buffer request signal. If the information is in the cache 35, the state machine 271 allows the information to be coupled from the cache 35 onto as described above in connection with FIG. 5, and the operation terminates.

If the information is not in the cache 35, and if the DMA OR WRT PND (DMA or write pending) signal is asserted, the state machine 271 asserts both the STALL and MBOX STALL signals to stall the processor 30, and CACHE ADRS (1:0) signals allowing a refresh operation. The stall permits the write operation to be completed before proceeding with the read operation.

If the DMA OR WRT PND (DMA or write pending) signal is negated, the read operation proceed. The state machine 271 enables the control logic 276 to assert the RD REQ read request signal. The state machine 271 then monitors the CACHEABLE, CCTL cache control, RDY ready and ERR error signals to determine the end of the read operation. If the CACHEABLE or CCTL cache control signals indicate that the information should not be cached, there is one transfer over bus 13. On the other hand, if the information is to be cached, two transfers are required, one for each word in the cache entry (FIG. 5). Since in one specific embodiment the second least significant address bit identifies the word being retrieved, during the second retrieval the second address bit in the read address register is inverted to identify the second word to be retrieved. Thus, the words may be retrieved in reverse order in which they are located in the addressable locations in the memory 11.

If the transfer is to be cached, when the RDY ready signal is received, if the DAL PAR ERR parity error signal is not asserted, indicating no parity error in the received information, the state machine 271 enables the multiplexer 264 (FIG. IB) to use the address from the virtual address translation circuit to select an entry in the cache 35, and enables the information to be loaded into either the selected high or low word. The word in the cache 35 into which the information is to be loaded depends on the condition of the VA (2) virtual address bit (see FIG. 5). The information is then coupled to the data path 36 (FIG. 1B).

If the DAL PAR ERR parity error signal is asserted, or if the ERR error signal is asserted on line 55 (FIG. 1A) indicating an error response by the other unit engaged in the transfer, the operation depends on whether the PREV IB REQ previous instruction buffer request signal is asserted. If it is, the control circuit 40 (FIG. 1B) is notified by an asserted IB FILL ERR instruction buffer fill error signal to permit it to take corrective action. If the PREV IB REQ previous instruction buffer request signal is not asserted, the STALL and MBOX STALL signals are asserted to stall the processor 30, and a TRAP REQ trap request signal is asserted, which allows the processor control circuit 40 to perform selected recovery operations.

If the received information is to be cached, and if neither the ERR error signal or the DAL PAR ERR parity error signal is asserted as the data is received, the state machine 271 proceeds to enable a second word to be received and stored in the cache 35. If the second word is properly received, it is stored in the cache 35 as described above. The state machine 271 generates CACHE ADRS(1:0) cache address signals which enable the multiplexer 264 to use the address from the virtual address translation circuit 37 and CACHE FTN (1:0) cache function signals enabling the second word to be stored in the cache entry. The state machine 271 does not, however, enable the information to be transferred to the data path 36.

On the other hand, if the ERR error signal or if the DAL PAR ERR parity error signals are asserted, the MBOX STALL signal is asserted to stall the virtual address translation circuit 37 and the entry in the cache into which the first word was written is marked invalid. At the same time, the CACHE ADRS (1:0) signals are conditioned to enable multiplexer 264 to use the refresh address from refresh counter 262 to refresh the contents of cache 35, and to increment the counter.

State machine 271 enables refresh operations to be performed whenever the state machine 271 is not enabling information to be written into or read out of the cache 35. To enable operations to occur, the state machine 271 generate CACHE ADRS signals which enable the multiplexer 264 to use refresh address signals from the refresh counter 262 to refresh the contents of th storage circuits 38, 41 and 42 (FIG. 1B) in a conventional manner.

State machine 271 also enables entries in cache 35 to be invalidated in response to a DMA INV REQ invalidate request signal from control logic 273. As described above in connection with FIG. 1B, this signal is generated in response to the coincidence of an asserted CCTL cache control signal and an asserted ADRS STR address strobe signal, when both signals are asserted by other units in the system depicted in FIG. 1A. This occurs when the other units are performing DMA (direct memory access) operations with memory 11, and so the DMG direct memory grant signal will be asserted. If another unit transfers data to a location in memory 11 which is cached in cache 35, the cache entry must be marked invalid. With reference to FIG. IB, in response to the coincidence of the DMG and ADRS STR address strobe signal, an AND gate 401 enables the input data latch 254 to latch the signals, which in this case are address signals, on DAL data/address lines 50.

In response to the DMA INV REQ invalidate request signal, the state machine 271 first attempts to perform a read operation of cache 35 using the address in the input data latch 254, without allowing the data from the cache to be coupled onto the internal bus 34. If the MISS signal is asserted, the location is not cached, and nothing further occurs.

However, if the MISS signal is negated, the location identified by the address in the input data latch 254 is cached, and the state machine initiates a cache invalidate operation. In this, it generates CACHE FTN (1:0) cache function signals which enable an invalidation operation, and CACHE ADRS (1:0) cache address signals which enable the multiplexer 264 to use the contents of the input data latch in the invalidation.

State machine 270 operates in response to the CCTL cache control, DMR direct memory request, RDY ready and ERR error signals from bus 13, RD REQ read request, WRT EEQ write request, BRDCST REQ broadcast request, and CACHE ACC cacheable access signals from control logic 276, and INH DMA inhibit direct memory access and ARM RD REQ arm read request signals from state machine 271. If the state machine 270 receives an asserted DMR direct memory request signal, indicating that another unit in the system depicted in FIG. 1A wishes to perform a transfer over bus 13, unless the INH DMA inhibit DMA or BRDCST REQ broadcast request signals are asserted, it negates the DIS DMG disable direct memory grant signal, which, in turn, enables control logic 277 to assert the DMG direct memory grant signal. The asserted DMG direct memory grant signal enables another unit to perform a transfer over bus 13. In addition, the state machine 270 asserts the DATA IN signal which enables DAL control logic 280 to condition the DAL data/address lines 50 to permit other units in the system to use them. The state machine 270 also asserts the TRI-STATE STR signal to enable control logic 277 to permit other units to use the DATA STR data strobe, ADRS STR address strobe, and TR TYPE transfer type signals.

Alternatively, if no other unit in the system is to perform a transfer over the bus 13, the state machine 270 enables transfers thereover in response to the RD REQ, WRT REQ, and BRDCST REQ broadcast request signals from control logic 276. If the WRT REQ write request signal is asserted, indicating a write address and write data in latches 251 and 250 (FIG. 1B) respectively, if the DMR signal is not asserted, the state machine 270 generates DAL CONT (1:0) (DAL contents) signals which enable the multiplexer 25 to couple write address from latch 251 onto the DAL data/address lines 50. Simultaneously, the state machine 270 asserts an ADRS STR EN address strobe enable signal which, in turn, enables the control logic 277 to assert the ADRS STR address strobe signal.

Next, the state machine 270 generates DAL CONT (1:0) (DAL contents) signals which enable multiplexer 253 to couple the contents of the write data latch 250 onto DAL data/address lines 50. Simultaneously, the state machine 270 asserts a DATA STR EN data strobe enable signal, which enables the control logic 277 to assert the DATA STR data strobe signal. Thereafter, the state machine waits until the RDY ready or ERR error signals are asserted. If the asserted RDY signal is received, the operation terminates by negating the ADRS STR EN address strobe enable and DATA STR EN data strobe enable signals, which in turn, enables control logic 277 to negate the ADRS STR address strobe and DATA STR data strobe signals, respectively, and the control logic 276 is enabled to negate the WRT REQ signal.

On the other hand, if the asserted ERR error signal is received, the state machine 270 performs a retry attempt, in which it generates DAL CONT (1:0) (DAL contents) signals which enable multiplexer 253 to couple the write data signals from latch 250 onto DAL data/address lines 50.

If both the RDY ready and ERR error signals are asserted, a retry is signaled, and the transfer is attempted again.

If no other operation is occurring, the state machine 270 generates DAL CONT (1:0) (DAL contents) signals which enable multiplexer 253 to couple the contents of the read address latch 252 onto the DAL data/address lines 50. This permits the state machine 270 to initiate a read operation quickly when other signals and conditions permit a read operation to occur. During a read operation, when the RD REQ read request signal is asserted, the state machine 270 asserts the ADRS STR EN address strobe enable signal, which, in turn, enables the control logic 277 to assert the ADRS STR address strobe signal. The state machine 270 then asserts the DATA IN data in signal which enables control logic 280 to condition the DAL data/address lines 50 to enable other units in the system to use them. Simultaneously, the state machine asserts the DATA STR EN data strobe enable, which, in turn, enables the control logic 277 to assert the DATA STR data strobe signal.

The next operations depend on whether the CACHE ACC cacheable access signal is asserted by control logic 276. If the signal is asserted, the retrieved data is cacheable, and so two words are read over bus 13. On the other hand, if the CACHE ACC cacheable access signal is not asserted, the retrieved data is not cacheable and only one word is read over bus 13. If the CACHE ACC cacheable access signal is not asserted, the state machine 270 asserts a RD DATA LAT read data latch signal which, when asserted, enables the input latch 254 (FIG. 1B) to receive the signals on DAL data/address lines 50. When the RD DATA LAT read data latch signal is thereafter negated, the signals are latched by the input latch. The state machine 270 negates the RD DATA LAT read data latch signal in response to the asserted RDY ready signal if the ERR error signal is negated and asserts the CLR RD FLAGS clear read flags signal. In response to the asserted CLR RD REQ signal, the control logic 276 negates the RD REQ read request signal.

On the other hand, if the CACHE ACC cacheable access signal is asserted, a read operation is performed as described above. If the CCTL cache control signal is not asserted when the data is latched in the input data latch, a second operation is also performed. If, on the other hand, the CCTL cache control signal is asserted, indicating that the other unit engaged in the transfer is precluding caching of the data, the second operation is not performed.

The state machine 271 uses the INH DMA inhibit direct memory access signal to inhibit state machine 270 from asserting the DMG direct memory grant signal in response to the receipt of a DMR direct memory request signal from other units. The INH DMA inhibit direct memory access signal is asserted during certain transfers with the floating point processor 31 (FIG. 1A).

The RD BRDCST read broadcast and BASIC BRDCST basic broadcast signal from control circuit 40 enable the state machine 271 to transfer floating point operand information from cache 35 or registers 255 in data path 36 (see FIG. 1B). The control logic 276 is also enabled to assert the BRDCST REQ broadcast request signals to, in turn, enable the state machine 270 to transfer this information as described above. The state machine 271 also enables control logic 273 to set a flag which asserts an FPP PND floating point processor pending signal. The state machine 271 asserts an SIG FPP signal floating point processor signal to indicate to FPP interface circuitry 272 that it is ready to receive the results of a floating point operation from the floating point processor 31. When the condition codes are ready, as described above, the interface circuitry 272 asserts a CP OK signal, and when the result data is ready, it asserts a CP RDY ready signal. In response to the CP RDY ready signal, state machine 271 enables state machine 270 to receive the result data. If the floating point processor 31 signals an error, the interface circuitry 272 asserts a CP ERR error signal. In response to the CP OK, CP RDY or CP ERR signal, the state machine 271 enables the flag controlling the FPP PND floating point processor pending signal to be reset, thereby negating the signal.

The bus interface circuit 33 provides a number of benefits. First, the use of two state machines 70 and 271, each controlling different operations and communicating through flags, simplifies the circuitry considerably.

Furthermore, the state machine 271 enables refreshing of the cache 35, permitting use of dynamic memory elements therein. This reduces the physical size of the cache, or alternatively facilitates providing more cache storage in the same area, as has been the case in the past.

Furthermore, it will be appreciated that the bus interface circuit 33, in retrieving cachable data, first retrieves the data which is required by the program, and then retrieves the other word for storage in the cache entry. In prior systems, the data words were retrieved in the order in which they were stored in memory, and so the first data word may not have been the one immediately required by the program. This delayed resumption of processing until the second word was retrieved.

In addition, the bus interface circuit 33 permits read operations to be initiated, to the extent that a read address is generated and latched in the read address latch 252, while a write operation is pending. The read operation is not completed until the pending write operation is completed, but when the write operation has been completed, the read address can be transmitted immediately.

Finally, the bus interface circuit also permits cache entries to be invalidated, by direct memory access operation performed by other units in the system depicted in FIG. 1A, independently of whether read or write operations have been se up in processor 30. That is, the cache entry invalidate operation can take place, in response to a DMA address received in input latch 254, while write data and a write address are latched in the respective latches 251 and 250 (FIG. 1B) and a read address is latched in latch 252. This simplifies the invalidation process.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A processor including a processing circuit for processing information and a bus interface circuit for connection to a bus for transferring information over said bus from other units in a digital data processing system to said processing circuit for processing and for transferring processed information over said bus from said processing circuit to said other units, said interface circuit including:
   A. an input latch connected to said processing circuit and for connection to said bus for latching information received from another unit for transfer to said processing circuit;
   B. an output latch connected to said processing circuit and for connection to said bus for latching information from said processing circuit for transfer to another unit;
   C. an interface control circuit including:
      i. an internal state control circuit connected to said processing circuit, said output latch and said input latch for controlling information transfers between said processing circuit and said output latch and said input latch;
      ii. an external state control circuit connected to said input latch, said output latch and for connection to said bus for controlling information transfers between said other units and said input latch and said output latch; and
      iii. a condition indicator connected to said internal state control circuit and said external state control circuit and controlled by said internal state control circuit to have a selected condition in response to conditions of said input latch and said output latch to thereby control operations of said external state control circuit.

2. A processor as defined in claim 1 in which said bus includes control signals for controlling transfers of information thereover, both said internal state control circuit and said external state control circuit receiving said control signals and operating in response thereto.

3. A processor as defined in claim 2 wherein one of said control signals is a direct memory request signal asserted by another unit when it needs to initiate an information transfer over said bus, said external state control circuit receiving said direct memory grant signal to enable said other unit to initiate an information transfer over said bus, said internal state control circuit also receiving said direct memory request signal add generating, in response thereto and to signals from said processing circuit, an inhibit signal for inhibiting said external state control circuit from generating said direct memory grant signal.

4. A processor as defined in claim 3 wherein said information include data and addresses, another unit transferring data to said processor over said bus in response to receipt of an address from said processor during a read operation, said bus interface circuit further including an address latch connected to both said internal state control circuit and said external state control circuit, said internal state control circuit enabling said address latch to receive an address from said processing circuits and said input latch to receive said data in response to the receipt of a ready signal, said internal state control circuit generating a read request signal in response to the receipt of a read enabling signal from said processing circuits, said external state control circuit receiving said read request signal and in response thereto enabling said address latch to transmit said address over said bus and generating control signals for transmission over said bus to enable said other unit to respond thereto during said read operation.

5. A processor as defined in claim 4 wherein said internal state control circuit further receives an error signal from said bus during a read operation, said internal state control circuit initiating an error recovery operation in response thereto.

6. A processor as defined in claim 5 further including a cache memory, said bus control signals further including a cache control signal having a plurality of conditions, said internal state control circuit receiving said cache control signal selectively enabling said cache memory to cache said information in response to the condition of said cache control signal and said ready signal.

7. A processor as defined in claim 5 further including a cache memory that receives the address from said processing circuit and generates in response thereto a hit signal having selected conditions, said internal state control circuit receiving said hit signal and selectively generating said read request signal in response to the condition of said hit signal.

8. A processor as defined in claim 2 wherein said processing circuit generates information, including data and an address, for transfer over said bus to another unit, the bus interface circuit further including a address latch connected to said processing circuit for receiving said address, said internal state control circuit enabling said address latch to receive the address and the output latch to receive the data and generating a write request signal, said external state control circuit receiving said write request signal and, in response thereto enabling said address latch to transmit the address over said bus and said output latch to transmit the data over said bus and generating control signals for transmission to said other unit to enable it to receive said address and data.

9. A processor as defined in claim 8 further including a cache memory that generates in response to said address a hit signal having selected conditions, said internal state control circuit enabling said cache memory to cache the data from the processing circuits during a write operation in response to the condition of the hit signal.

10. A bus interface circuit for connection to a processing circuit and a bus for transferring information over said bus from another unit to said processing circuit for processing and for transferring processed information over said bus from said processing circuit to said other unit, said interface circuit including:
  A. an input latch for connection to said processing circuit and to said bus for latching information received from another unit for transfer to said processing circuit;
  B. an output latch for connection to said processing circuit and to said bus for latching information from said processing circuit for transfer to another unit;
  C. an interface control circuit including:
    i. an internal state control circuit for connection to said processing circuit, and connected to said output latch and said input latch for controlling information transfers between said processing circuit and said output latch and said input latch;
    ii. an external state control circuit for connection to said input latch, and connected said output latch and for connection to said bus for controlling information transfers between said other units and said input latch and said output latch; and
    iii. a condition indicator connected to said internal state control circuit and said external state control circuit and controlled by said internal state control circuit to have a selected condition in response to conditions of said input latch and said output latch to thereby control operations of said external state control circuit.

11. A bus interface circuit as defined in claim 10 in which said bus includes control signals for controlling transfers of information thereover, both said internal state control circuit and said external state control circuit receiving said control signals and operating in response thereto.

12. A bus interface circuit as defined in claim 11 wherein one of said control signals is a direct memory request signal asserted by another unit when it needs to initiate an information transfer over said bus, said external state control circuit receiving said direct memory request signal and generating in response thereto a direct memory grant signal to enable said other unit to initiate an information transfer over said bus, said internal state control circuit also receiving said direct memory request signal and generating, in response thereto and to signals from said processing circuit, an inhibit signal for inhibiting said external state control circuit from generating said direct memory grant signal.

13. A bus interface circuit as defined in claim 11 wherein said information includes data and addresses, another unit transferring data to said processor over said bus in response to receipt of an address from said processor during a read operation, said bus interface circuit further including an address latch connected to both said internal state control circuit and said external state control circuit, said internal state control circuit enabling said address latch to receive an address from said processing circuits and said input latch to receive said data in response to the receipt of a ready signal, said internal state control circuit enabling said condition indicator to generate a read request signal in response to the receipt of a read enabling signal from said processing circuits, said external state control circuit receiving said read request signal and in response thereto enabling said address latch to transmit said address over said bus and generating control signals for transmission over said bus to enable said other unit to respond thereto during said read operation.

14. A bus interface circuit as defined in claim 13 wherein said internal state control circuit further receives an error signal from said bus during a read operation, said internal state control circuit initiating an error recovery operation in response thereto.

15. A bus interface circuit as defined in claim 13 wherein said processor further includes a cache memory, said bus control signals further including a cache control signal having a plurality of conditions, said internal state control circuit receiving said cache control signal selectively enabling said cache memory to cache said information in response to the condition of said cache control signal and said ready signal.

16. A bus interface circuit as defined in claim 13 wherein said processor further includes a cache memory that receives the address from said processing circuit and generates in response thereto a hit signal having selected conditions, said internal state control circuit receiving said hit signal and enabling said condition indicator to selectively generate said read request signal in response to the condition of said hit signal.

17. A bus interface circuit as defined in claim 11 wherein said processing circuit generates information, including data and an address, for transfer over said bus to another unit, the bus interface circuit further including a address latch connected to said processing circuit for receiving said address, said internal state control circuit enabling said address latch to receive the address and the output latch to receive the data and enabling said condition indicator to generate a write request signal, said external state control circuit receiving said write request signal and, in response thereto enabling said address latch to transmit the address over said bus and said output latch to transmit the data over said bus and generating control signals for transmission to said other unit to enable it to receive said address and data.

18. A bus interface circuit as defined in claim 17 wherein said processor further includes a cache memory that generates in response to said address a hit signal having selected conditions, said internal state control circuit enabling said cache memory to cache the data from the processing circuits during a write operation in response to th condition of the hit signal.

19. A processor comprising:
A. a processing circuit for processing information, for generating information including addresses and data, and for generating a transfer type indication to identify a read operation or a write operation;
B. a cache memory connected to said processing circuit for caching information and generating a hit signal having selected conditions in response to the receipt of an address and the cached information;
C. a bus interface circuit for connection to a bus for receiving information over said bu from other units for processing and for transferring processed information over said bus from said processing circuit to said other units, said interface circuit including:
  i. an input latch connected to said processing circuit and for connection to said bus for latching data received from another unit for transfer to said processing circuit;
  ii. an output latch connected to said processing circuit and for connection to said bus for latching data from said processing circuit for transfer to another unit;
  iii. an address latch connected to said processing circuit and for connection to said bus for latching addresses from said processing circuit
  iv. an interface control circuit including
    A. an internal state control circuit connected to said processing circuit, said output latch, said input latch, said address latch and said bus for controlling data transfers between said processing circuit and said output latch and said input latch, for enabling said address latch to latch addresses from said processing circuit, and for generating transfer initiating signals to initiate a read operation or a write operation in response to the transfer type indication from said processing circuit, the condition of the hit signal from said cache memory, and control signals received over said bus;
    B. an external state control circuit connected to said input latch, said output latch, said address latch and for connection to said bus for generating control signals for selectively enabling the contents of said address latch and said output latch to be transmitted over said bus and said input latch to receive data over said bus, and for transmitting and receiving control signals over said bus; and
    C. a condition indicator connected to said internal state control circuit and said external sate control circuit and controlled by said transfer initiating signals to have selected conditions to control operations of said external state control circuit.

20. A bus interface circuit for use in a processor comprising a processing circuit for processing information, for generating information including addresses and data, and for generating a transfer type indication to identify a read operation or a write operation, and a cache memory connected to said processing circuit for caching information and generating a hit signal having selected conditions in response to the receipt of an address and the cached information, the bus interface circuit for connection to a bus for receiving information over said bus from other units for processing and for transferring processed information over said bus from said processing circuit to said other units, said interface circuit including comprising:
A. an input latch connected to said processing circuit and for connection to said bus for latching data received from another unit for transfer to said processing circuit;
B. an output latch connected to said processing circuit and for connection to said bus for latching data from said processing circuit for transfer to another unit;
C. an address latch connected to said processing circuit and for connection to said bus for latching addresses from said processing circuit
D. an interface control circuit including:
  i. an internal state control circuit connected to said processing circuit, said output latch, said input latch, said address latch and said bus for controlling data transfers between said processing circuit and said output latch and said input latch, for enabling said address latch to latch addresses from said processing circuit, and for generating transfer initiating signals to initiate a read operation or a write operation in response to the transfer type indication from said processing circuit, the condition of the hit signal from said cache memory, and control signals received over said bus;
  ii. an external state control circuit connected to said input latch, said output latch, said address latch and for connection to said bus for generating control signals for selectively enabling the contents of said address latch and said output latch to be transmitted over said bus and said input latch to receive data over said bus, and for transmitting and receiving control signals over said bus; and
  iii. a condition indicator connected to said internal state control circuit and said external state control circuit and controlled by said transfer initiating signals to have selected conditions to control operations of said external state control circuit.

* * * * *

UNITED STATES PATENT AND TRADEMARK OFFICE
CERTIFICATE OF CORRECTION

PATENT NO. : 4,831,520
DATED : May 16, 1989
INVENTOR(S) : Paul I. Rubinfeld, Anil K. Jain It is certified that error appears in the above-identified patent and that said Letters Patent is hereby corrected as shown below:

Column 3, line 1, "on" should be --one--.

Column 3, line 39, "location" should be -- locations--.

Column 4, line 53, "transfers" should be --transfer--.

Column 5, line 50, "determines" should be --determine--.

Column 8, line 57, "retrieve" should be --retrieved--.

Column 9, line 7, "e" should be --be--.

Column 10, line 39, "tee" should be --the--.

Column 13, line 5, insert --it-- before "wishes".

Column 15, line 15, insert --.-- after "86".

Column 15, line 37, "th" should be --the--.

Column 17, line 27, "RESULT$" should be --RESULTS--.

UNITED STATES PATENT AND TRADEMARK OFFICE
CERTIFICATE OF CORRECTION

PATENT NO. : 4,831,520

DATED : May 16, 1989

INVENTOR(S) : Paul I. Rubinfeld, Anil K. Jain

It is certified that error appears in the above-identified patent and that said Letters Patent is hereby corrected as shown below:

Column 17, line 62, "th" should be --the--.

Column 19, line 34, "VVA" should be --VA--.

Column 21, line 1, "mode" should be --modes--.

Column 21, line 45, "o" should be --of--.

Column 23, line 9, "carrie" should be --carries--.

Column 29, line 12, "IB" should be --1B--.

Column 29, line 43, "an unit" should be --a unit--.

Column 29, line 50, "550" should be --250--.

Column 30, line 63, insert --,-- after "enabled".

Column 32, line 47, "th" should be --the--.

Column 33, line 17, "EEQ" should be --REQ--.

UNITED STATES PATENT AND TRADEMARK OFFICE
CERTIFICATE OF CORRECTION

PATENT NO. : 4,831,520

DATED : May 16, 1989

INVENTOR(S) : Paul I. Rubinfeld, Anil K. Jain

It is certified that error appears in the above-identified patent and that said Letters Patent is hereby corrected as shown below:

Column 33, line 49, "25" should be --253--.

Column 35, line 25, "70" should be --270--.

Column 36, line 46, insert after "memory" the following: --request signal and generating in response thereto a direct memory--.

Column 36, line 49, "add" should be --and--.

Column 36, line 55, "include" should be --includes--.

Column 37, line 28, "a" should be --an--.

Column 39, line 7, "a" should be --an--.

Column 39, line 24, "th" should be --the--.

Column 39, line 35, "bu" should be --bus--.

Signed and Sealed this

Seventeenth Day of April, 1990

Attest:

HARRY F. MANBECK, JR.

*Attesting Officer*  *Commissioner of Patents and Trademarks*